US008484425B2

(12) United States Patent
Innan et al.

(10) Patent No.: US 8,484,425 B2
(45) Date of Patent: Jul. 9, 2013

(54) STORAGE SYSTEM AND OPERATION METHOD OF STORAGE SYSTEM INCLUDING FIRST AND SECOND VIRTUALIZATION DEVICES

(75) Inventors: Masataka Innan, Odawara (JP); Akira Murotani, Odawara (JP); Akinobu Shimada, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/222,569

(22) Filed: Aug. 31, 2011

(65) Prior Publication Data

US 2011/0314250 A1 Dec. 22, 2011

Related U.S. Application Data

(63) Continuation of application No. 12/367,706, filed on Feb. 9, 2009, now Pat. No. 8,180,979, which is a continuation of application No. 11/181,877, filed on Jul. 15, 2005, now abandoned.

(30) Foreign Application Priority Data

May 24, 2005 (JP) ................................. 2005-150868

(51) Int. Cl.
*G06F 12/00* (2006.01)
*G06F 13/00* (2006.01)
*G06F 13/28* (2006.01)
*G06F 15/173* (2006.01)

(52) U.S. Cl.
USPC ........... 711/154; 711/110; 711/170; 709/223; 709/224; 709/226

(58) Field of Classification Search
USPC ................. 711/154, 170, 110; 709/223, 224, 709/226
See application file for complete search history.

(56) References Cited

U.S. PATENT DOCUMENTS

| 5,889,520 | A | 3/1999 | Glaser |
| 6,067,545 | A | 5/2000 | Wolff |
| 6,101,508 | A | 8/2000 | Wolff |
| 6,240,494 | B1 | 5/2001 | Nagasawa et al. |

(Continued)

FOREIGN PATENT DOCUMENTS

| CN | 1604028 A | 4/2005 |
| GB | 2406406 | 3/2005 |

(Continued)

OTHER PUBLICATIONS

Office Action in European Patent Application 05 257 515.6-1245, Jun. 4, 2009.

*Primary Examiner* — Michael Alsip
(74) *Attorney, Agent, or Firm* — Mattingly & Malur, PC

(57) ABSTRACT

The present invention is able to improve the processing performance of a storage system by respectively virtualizing the external volumes and enabling the shared use of such external volumes by a plurality of available virtualization storage devices. By virtualizing and incorporating the external volume of an external storage device, a first virtualization storage device is able to provide the volume to a host as though it is an internal volume. When the load of the first virtualization storage device increases, a second virtualization storage device 2 is newly introduced, and connected to the storage system. When a transfer direction is issued from a management terminal, the external volume relating to the selected logical volume is transferred from the first virtualization storage device to the second virtualization storage device.

21 Claims, 19 Drawing Sheets

U.S. PATENT DOCUMENTS

| | | |
|---|---|---|
| 6,457,109 B1 | 9/2002 | Milillo et al. |
| 6,675,268 B1 | 1/2004 | DeKoning et al. |
| 6,732,104 B1 | 5/2004 | Weber |
| 6,889,286 B2 | 5/2005 | Hino et al. |
| 6,976,134 B1 | 12/2005 | Lolayekar et al. |
| 7,031,975 B2 | 4/2006 | Kanie |
| 7,103,727 B2 | 9/2006 | Morishita et al. |
| 7,127,445 B2 | 10/2006 | Mogi et al. |
| 7,337,350 B2 | 2/2008 | Mimatsu et al. |
| 2002/0184439 A1 | 12/2002 | Hino et al. |
| 2002/0184463 A1 | 12/2002 | Arakawa et al. |
| 2003/0065780 A1* | 4/2003 | Maurer et al. ............... 709/225 |
| 2003/0079018 A1 | 4/2003 | Lolayekar et al. |
| 2003/0079019 A1 | 4/2003 | Lolayekar et al. |
| 2003/0093541 A1 | 5/2003 | Lolayekar et al. |
| 2003/0093567 A1 | 5/2003 | Lolayekar et al. |
| 2003/0101317 A1* | 5/2003 | Mizuno et al. ............... 711/114 |
| 2003/0126200 A1 | 7/2003 | Wolff |
| 2003/0191840 A1 | 10/2003 | Maciel |
| 2003/0204597 A1 | 10/2003 | Arakawa et al. |
| 2003/0221077 A1 | 11/2003 | Ohno et al. |
| 2003/0229645 A1 | 12/2003 | Mogi et al. |
| 2004/0049553 A1 | 3/2004 | Iwamura et al. |
| 2004/0078465 A1 | 4/2004 | Coates et al. |
| 2004/0143832 A1 | 7/2004 | Yamamoto et al. |
| 2004/0193827 A1 | 9/2004 | Mogi et al. |
| 2004/0257857 A1 | 12/2004 | Yamamoto et al. |
| 2005/0071559 A1 | 3/2005 | Tamura et al. |
| 2005/0198457 A1 | 9/2005 | Mizuno et al. |
| 2005/0257014 A1 | 11/2005 | Maki et al. |

FOREIGN PATENT DOCUMENTS

| | | |
|---|---|---|
| JP | 5-313974 A | 11/1993 |
| JP | 11-296313 A | 10/1999 |
| JP | 2000-099272 A | 4/2000 |
| JP | 2002-516446 A | 6/2002 |
| JP | 2003-162377 A | 6/2003 |
| JP | 2003-296035 A | 10/2003 |
| JP | 2003-316522 A | 11/2003 |
| JP | 2004-13454 A | 1/2004 |
| JP | 2004-507813 A | 3/2004 |
| JP | 2004-102374 A | 4/2004 |
| JP | 2004-178253 A | 6/2004 |
| JP | 2004-220450 A | 8/2004 |
| JP | 2004-234556 A | 8/2004 |
| JP | 2004-302751 A | 10/2004 |
| JP | 20004-348174 A | 12/2004 |
| JP | 2005-55963 A | 3/2005 |
| JP | 2005-107645 A | 4/2005 |
| JP | 2005-108261 A | 4/2005 |
| WO | 99/60564 A2 | 11/1999 |
| WO | 03/027886 | 4/2003 |
| WO | 03/030431 | 4/2003 |
| WO | 03/030449 | 4/2003 |

* cited by examiner

FIG. 5

MANAGEMENT TABLE T1A

| WWN | LU# | SIZE | EXTERNAL VOLUME NUMBER | OWNER RIGHT | TRANSFER STATUS |
|---|---|---|---|---|---|
| WWN1 | LU#0 | VS0 | EV#0000 | 0 | 0 |
| WWN2 | LU#1 | VS1 | EV#0001 | 1 | 0 |
| WWN3 | LU#2 | VS2 | EV#0002 | -1 | 0 |
| ... | ... | ... | ... | ... | ... |

LU ATTRIBUTE TABLE T2A

| LU# | PATH DEFINITION | REPLICATION CONFIGURATION INFORMATION | REPLICATION STATUS | REPLICATION BITMAP |
|---|---|---|---|---|
| LU#0 | CHA#0-PORT#0, CHA#1-PORT#0 | P1 | PAIR | ... |
| LU#1 | CHA#0-PORT#1, CHA#1-PORT#1 | S1 | PAIR | ... |
| LU#1 | CHA#0-PORT#2, CHA#1-PORT#2 | P1 | RESYNC | ... |
| LU#1 | CHA#0-PORT#3, CHA#1-PORT#3 | S1 | RESYNC | ... |
| ... | ... | ... | ... | ... |

STORAGE SYSTEM AND OPERATION METHOD OF STORAGE SYSTEM INCLUDING FIRST AND SECOND VIRTUALIZATION DEVICES

CROSS-REFERENCE TO RELATED APPLICATIONS

This application is a continuation application of U.S. Ser. No. 12/367,706, filed Feb. 9, 2009 (now U.S. Patent No. 8,180,979), which is a continuation application of U.S. Ser. No. 11/181,877, filed Jul. 15, 2005 (now abandoned), which relates to and claims priority from Japanese Patent Application No. 2005-150868 filed on May 24, 2005, the entire disclosures of all of which are incorporated herein by reference.

BACKGROUND OF THE INVENTION

The present invention relates to a storage system and an operation method of a storage system.

For instance, government agencies, companies, educational institutions and others manage data with a relative large storage system for handling various data in large quantities. This storage system, for example, is configured by including a storage device such as a disk array device. For instance, a storage device is configured by disposing a plurality of memory apparatuses in an array to provide a memory area based on RAID (Redundant Array of Inexpensive Disks). At least one or more logical volumes are formed on a physical memory area provided by the memory apparatus group, and this logical volume is provided to a host computer (hereinafter abbreviated as "host"). By transmitting a write command or read command, the host is able to write and read data into and from the logical volume.

Data to be managed by companies and others is increasing daily. Thus, companies and others, for example, equip the storage system with a new storage device to expand the storage system. Two methods can be considered for introducing a new storage device to the storage system. One method is to replace the old storage device with a new storage device. Another method is to make the old storage device and new storage device coexist.

Nevertheless, when making a full transition from the old storage device to a new storage device, the old storage device cannot be utilized. Meanwhile, when making the old storage device and new storage device coexist, the configuration of the storage system will become complex, and the management and operation thereof will become extremely troublesome.

Thus, the present applicant has proposed technology of connecting a host and a first storage device and connecting the first storage device and a second storage device so that the first storage device will act over and process the access request from the host (Japanese Patent Laid-Open Publication No. 2004-005370). With this technology, the first storage device will also receive and process commands targeting the second storage device. If necessary, the first storage device issues a command to the second storage device, receives the processing result thereof, and transmits this to the host.

With the conventional technology described in the foregoing document, the performance of the storage system is improved by making the first storage device and second storage device coexist without wasting any memory resource. Nevertheless, even with this kind of reinforced storage system, the processing performance may deteriorate during the prolonged operation thereof.

For example, if the number of hosts connected to the first storage device increases, since numerous access requests will be issued from the respective hosts, the processing performance of the storage system will most likely deteriorate. Further, data to be managed will increase daily, and the method of use and frequency of use will differ diversely according to the nature of the respective data.

Thus, further reinforcement of the storage system is desired. In such a case, the first storage device may be replaced with a different high-performance storage device, or a separate first storage device may be added to the existing first storage device. Nevertheless, the addition or replacement of the first storage device cannot be conducted as with the addition of the first storage device described in the foregoing document. This is because the first storage device is serially connected to the second storage device and uses the memory resource of the second storage device, and the configuration of the storage system is already complicated. The first storage device cannot be simply added or replaced by only focusing attention on the first storage device.

SUMMARY OF THE INVENTION

The present invention was devised in view of the foregoing problems, and an object of the present invention is to provide a storage system and an operation method of a storage system configured by hierarchizing a plurality of storage devices for improving the processing performance thereof relatively easily. Another object of the present invention is to provide a storage system and an operation method of a storage system for improving the processing performance by enabling the shared use of one or a plurality of connection destination storage devices by a plurality of connection source storage devices. Other objects of the present invention will become clear from the detailed description of the preferred embodiments described later.

In order to achieve the foregoing objects, the storage system according to the present invention has a plurality of connection source storage devices capable of respectively providing a logical volume to a host device; a connection destination storage device respectively connected to each of the connection source storage devices and having a separate logical volume; and a direction unit for directing the connection destination of the separate logical volume. And each of the connection source storage devices is configured by respectively having: a management information memory unit for storing management information for managing the separate logical volume; and a control unit for connecting the logical volume and the separate logical volume via an intermediate volume based on the management information stored in the management information memory unit; wherein the connection destination of the separate logical volume can be switched among each of the connection source storage devices based on the designation from the direction unit.

The logical volume of the connection source storage device can be connected to a separate logical volume of the connection destination storage device via an intermediate volume. This connection may be made based on the management information stored in the management information memory unit.

Here, when focusing on the connection source storage device, the connection destination storage device is an external storage device positioned outside the connection source storage device, and the separate logical volume of the connection destination storage device is an external volume positioned outside the connection source storage device. Therefore, in the following explanation, for ease of under the present invention, the connection destination storage device may be referred to as an external storage device, and the separate logical volume may be referred to as an external volume, respectively.

The host device issues a read command, write command and so on with the logical volume of the connection source storage device as the access target. When the connection source storage device receives an access request from the host device, it issues a prescribed command to the external volume connected to the logical volume of the access target, and reads and writes data from and into the external volume. As described above, the logical volume of the connection source storage device is an access destination volume to become the access target from the host device, and the external volume (separate logical volume) of the external storage device is the data storage destination volume for actually storing the data. The host device is not able to directly recognize the external volume, and the external volume is transparent to the host device.

The direction unit designates to which logical volume of the connection source storage device the external volume should be connected. Based on this designation, the connection designation of the external volume is switched among the respective connection source storage devices. In other words, when an external volume is connected to a logical volume of one connection source storage device via an intermediate volume, when the direction unit designates the switch to the other connection source storage device, the external volume is connected to a logical volume of the other connection source storage device via an intermediate volume.

Thereby, a plurality of connection source storage devices may exclusively use one or a plurality of external volumes. Accordingly, for example, when there are numerous access requests to a specific external volume, such high-load external volume is transferred to a separate connection source storage device in order to disperse the load, and the processing performance of the overall storage system can be improved thereby.

In the present embodiment, the connection destination of the separate logical volume is switchable among each of the connection source storage devices without stopping the access from the host device to the logical volume.

In the present embodiment, the access destination of the host device is switched among each of the connection source storage devices according to the switching of the connection destination of the separate logical volume. In other words, when the connection destination of the external volume is switched from one connection source storage device to the other connection source storage device, the access destination of the host device will also be switched from one connection source storage device to the other connection source storage device.

In the present embodiment, the management information is constituted by including first management information for specifying the separate logical volume, and second management information for managing the attribute of the separate logical volume; the first management information is retained by each of the connection source storage devices; and the second management information is retained by the connection source storage device of the switching destination selected as the connection destination of the separate logical volume.

In other words, the management information for managing the separate logical volume has first management information and second management information, and the first management information is stored in each of the connection source storage devices, and the second management information is stored in the connection source storage device requiring such second management information.

In the present embodiment, the first management information contains volume identifying information for specifying the separate logical volume in the storage system, usage authorization information for specifying the connection source storage device having usage authorization of the separate logical volume, and switching status information for showing whether the connection destination of the separate logical volume is being switched among each of the connection source storage devices; and the second management information contains a plurality of pieces of other attribute information relating to the separate logical volume.

In the present embodiment, the usage authorization information is set with the connection source storage device that becomes the switching source among each of the connection source storage devices, notified from the connection source storage device that becomes the switching source to the connection source storage device that becomes the switching destination, and the change of the usage authorization information is determined by the connection source storage device that becomes the switching source receiving the setting completion report from the connection source storage device that becomes the switching destination.

In the present embodiment, a switching status flag is set while the connection destination of the separate logical volume is being switched from the connection source storage device that becomes the switching source to the connection source storage device that becomes the switching destination, and the switching status flag is reset when the connection destination of the separate logical volume is switched; while the switching status flag is being set, the connection source storage device that becomes the switching source destages unwritten data relating to the separate logical volume, and the connection source storage device that becomes the switching destination processes write data from the host device with an asynchronous system; and when the switching status flag is reset, the switching destination storage device destages the write data.

Here, an asynchronous transfer mode is a mode for, in the case of writing data in a logical volume, reporting the completion of writing to the host device before writing such data in a physical memory apparatus. Contrarily, a synchronous transfer mode is a mode for, in the case of writing data in a logical volume, reporting the completion of writing to the host device after confirming that such data has been written in a physical memory apparatus.

In the present embodiment, the connection source storage device that becomes the switching source among each of the connection source storage devices rejects the processing of access from the host device to the separate logical volume, and destages unwritten data relating to the separate logical volume.

In other words, the connection source storage device that becomes the switching source, among the access requests from the host device, rejects the access request relating to the external volume to be transferred to the connection source storage device that becomes the switching destination. A rejection may be made positively or negatively. And, the connection source storage device that becomes the switching source destages unwritten data relating to such external volume to be transferred. As a result, the consistency of the data stored in such external volume can be maintained.

In the present embodiment, when the destage is complete, the connection source storage device that becomes the switching source issues a destage completion report to the connection source storage device that becomes the switching destination; and upon receiving the destage completion report, the connection source storage device that becomes the switching destination performs the processing of access from the host device to the separate logical volume.

In other words, the dirty data before transfer (before switching) is written in a physical memory apparatus configuring the external volume of the transfer target to maintain the consistency of data.

In the present embodiment, a monitoring unit is further provided for monitoring the load status relating to at least the connection source storage device that becomes the switching source among each of the connection source storage devices.

And, the connection source storage device that becomes the switching source and the connection source storage device that becomes the switching destination among each of the connection source storage devices are respectively selected based on the monitoring result of the monitoring unit.

As the load status, for instance, input/output per second (IOPS), CPU usage rate, cache memory usage rate, data traffic and so on may be considered. For example, when there is a logical volume where the load status became higher and a prescribed threshold value, the external volume to which such logical volume is connected is transferred to a separate connection source storage device. Thereby, the load of the connection source storage device of the switching source can be reduced.

In the present embodiment, a management terminal to be connected to each of the connection source storage devices is further provided, wherein the direction unit and the monitoring unit are respectively provided to the management terminal.

The storage system according to another perspective of the present invention has a plurality of connection source storage devices to be used by at least one or more host devices, and at least one or more connection destination storage devices to be connected to each of the connection source storage devices, wherein the host device and each of the connection source storage devices are respectively connected via a first communication network, and each of the connection source storage devices and the connection destination storage device are connected via a second communication network separated from the first communication network Further, the connection destination storage device has a separate logical volume to be logically connected to a logical volume of each of the connection source storage devices. And, each of the connection source storage devices has a control unit for creating the logical volume and connecting the logical volume and the separate logical volume via an intermediate volume based on management information; and a memory used by the control unit and for storing the management information.

Moreover, the management terminal to be connected to each of the connection source storage devices has a monitoring unit for respectively monitoring the load status of each of the connection source storage devices, and a direction unit for respectively selecting the connection source storage device that becomes the switching source and the connection source storage device that becomes the switching destination among each of the connection source storage devices based on the monitoring result of the monitoring unit.

In addition, the management terminal switches the connection destination of the separate logical volume from the connection source storage device selected as the switching source to the connection source storage device selected as the switching destination based on the designation from the direction unit;

Further, the management information is constituted by including first management information for specifying the separate logical volume, and second management information for managing the attribute of the separate logical volume, and the first management information is respectively stored in the connection source storage device selected as the switching source and the connection source storage device selected as the switching destination.

The entirety of the second management information is stored in the connection source storage device selected as the switching source, and only the second management information relating to the separate logical volume in which the connection destination is switched is transferred from the connection source storage device selected as the switching source to the connection source storage device selected as the switching destination.

The operation method of a storage system according to yet a different perspective of the present invention is a method of operating a storage system having a first connection source storage device and a second connection source storage device capable of respectively providing a logical volume to a host device via a first communication network, and a connection destination storage device connected to each of the first and second connection source storage device via a second communication network, comprising the following steps.

In the initial operation step, the plurality of separate logical volumes are respectively connected to one or a plurality of logical volumes of the first connection source storage device via an intermediate volume of the first connection source storage device based on the management information for respectively connecting to a plurality of separate logical volumes of the connection destination storage device, and the first connection source storage device is made to process the access request from the host device.

In the device addition step, the second connection source storage device is connected to the host device via the first communication network, to the connection destination storage device via the second communication network, and to the first connection source storage device via a third communication network.

In the first management information transfer step, information for respectively specifying the plurality of separate logical volumes among the management information of the first connection source storage device is transferred from the first connection source storage device to the second connection source storage device via the third communication network.

In the transfer target selection step, a separate logical volume is selected to be transferred to the second connection source storage device among the plurality of separate logical volumes used by the first connection source storage device.

In the second management information transfer step, attribute information relating to the separate logical volume selected as the transfer target among the management information of the first connection source storage device is transferred from the first connection source storage device to the second connection source storage device via the third communication network.

In the additional operation step, the separate logical volume selected as the transfer target is connected to the logical volume of the second connection source storage device via an intermediate volume of the second connection source storage device based on the information acquired at the first management information transfer step and the second management information transfer step, the path information for the host device to access the logical volume of the second connection source storage device is set in the host device, and the second connection source storage device is made to process the access request from the host device.

Incidentally, the third communication network may also be used in combination with either the first communication network or second communication network.

The whole or a part of the means, functions and steps of the present invention may sometimes be configured as a computer program to be executed with a computer system. When the whole or a part of the configuration of he present invention is configured as a computer program, such computer program, for instance, may be fixed in various storage mediums and distributed, or transmitted via a communication network.

BRIEF DESCRIPTION OF THE DRAWINGS

FIG. 5 is an explanatory diagram showing the respective configurations of the management table and attribute table to be used by a first virtualization storage device;

FIG. 8 is a flowchart showing the processing of the virtualization storage devices acquiring information on the external storage device and creating a management table and the like;

DESCRIPTION OF THE SPECIFIC EMBODIMENTS

Figure 1:
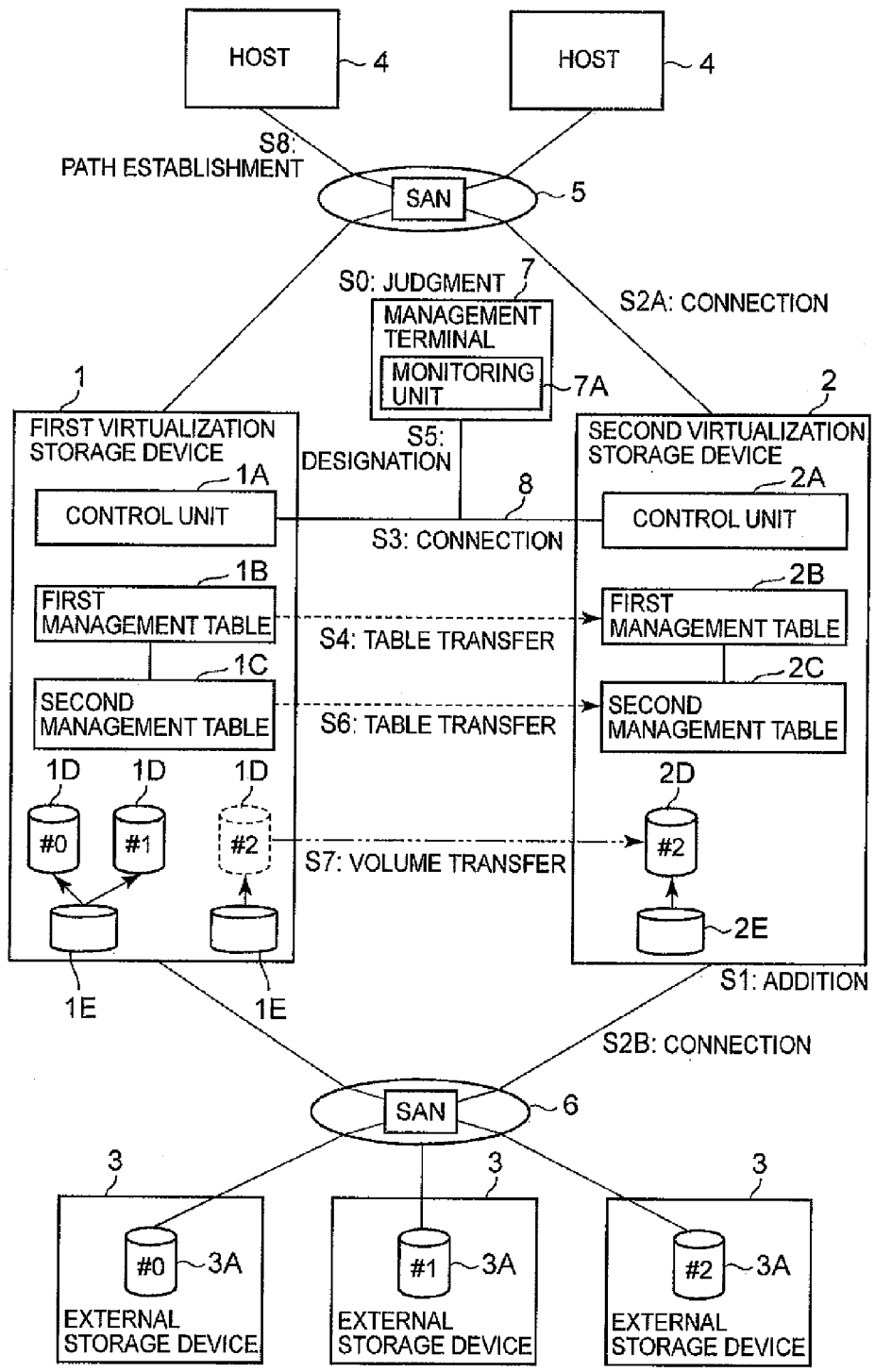
FIG. 1 is an explanatory diagram showing the overall concept of an embodiment of the present invention.

FIG. 1 is an explanatory diagram of the configuration showing the overall schematic of an embodiment of the present invention. As shown in FIG. 1, this storage system, for instance, may be configured by having a plurality of virtualization storage devices 1, 2, a plurality of external storage devices 3, a plurality of host devices (hereinafter referred to as a "host") 4, an upper level SAN (Storage Area Network) 5, a lower level SAN 6, a management terminal 7, and a device-to-device LAN (Local Area Network) 8.

Here, the virtualization storage device 1, 2 corresponds to a "connection source storage device", and the external storage device 3 corresponds to a "connection destination storage device". The host 4 corresponds to a "host device", the upper level SAN 5 corresponds to a "first communication network", the lower level SAN 6 corresponds to a "second communication network", the management terminal 7 corresponds to a "management terminal", and the device-to-device LAN 8 corresponds to a "third communication network".

Incidentally, the upper level SAN 5 and lower level SAN 6, for example, may be configured as a FC_SAN (Fibre Channel_Storage Area Network) or IP_SAN (Internet Protocol_SAN), but it is not limited thereto, and, for instance, may also be configured as a LAN or WAN (Wide Area Network). The upper level SAN 5 is used for respectively connecting the respective hosts 4 and the respective virtualization storage devices 1, 2. The lower level SAN 6 is used for respectively connecting the respective virtualization storage devices 1, 2 and the respective external storage device 3. The upper level SAN 5 and lower level SAN 6 are separated, and the traffic or failure of one communication network will not directly influence the other communication network.

Attention is focused on the configuration of the first virtualization storage device 1. The first virtualization storage device 1 is used for virtualizing a volume 3A of the external storage device 3 and providing this to the host 4. This first virtualization storage device 1, for instance, has a control unit 1A, a first management table 1B, a second management table 1C, a logical volume 1D, and an intermediate volume 1E.

Here, the control unit 1A corresponds to a "control unit", the first management table 1B corresponds to "first management information", the second management table 1C corresponds to "second management information, the logical volume 1D corresponds to a "logical volume", and the intermediate volume 1E corresponds to an "intermediate volume".

The control unit 1A controls the overall operation of the first virtualization storage device 1. The control unit 1A, for instance, creates a logical volume 1D and provides this to the host 4. Further, the control unit 1A connects the logical volume 1D and external volume 3A via the intermediate volume 1E by using the first management table 1B and second management table 1C. Moreover, the control unit 1A transfers the whole or a part of the external volume 3A under its own control to the second virtualization storage device 2 based on the designation from the management terminal 7.

The first management table 1B is used for identifying the respective external volumes 3A in the storage system and connecting a desired external volume 3A to the logical volume 1D. The second management table 1C is used for managing other attribute information such as the copy status or difference management information (difference bitmap) of the respective external volumes 3A.

The second virtualization storage device 2 may be configured the same as the first virtualization storage device 1. The second virtualization storage device 2, as with the first virtualization storage device 1, is able to connect the whole or a part of the respective external volumes 3A to the logical volume 2D via the intermediate volume 2E. And, the second virtualization storage device 2, as with the first virtualization storage device 1, is able to provide the external volume 3A to the host 4 as though it is one's own internal volume.

The second virtualization storage device 2, for instance, may be configured by having a control unit 2A, a first management table 2B, a second management table 2C, a logical volume 2D and an intermediate volume 2E. Each of these components 2A to 2E have the same configuration as each of the components 1A to 1E described with reference to the first virtualization storage device 1, and the detailed description thereof is omitted.

Nevertheless, it should be noted that the size of the second management table 2C is smaller than the size of the second management table 1C of the first virtualization storage device 1. In the present embodiment, only the attribute information relating to the external volume 3A transferred from the first virtualization storage device 1 to the second virtualization storage device 2 is copied from the second management table 1C of the first virtualization storage device 1 to the second management table 2C of the second virtualization storage device 2. Accordingly, the table size of the second management table 2C is smaller than that of the second management table 1C.

When the first virtualization storage device 1 is already being used prior to the second virtualization storage device 2 being added to the storage system; that is, when the first virtualization storage device 1 is virtualizing and using all external volumes 3A, the first virtualization storage device 1 has already obtained the attribute information of all external volumes 3A. Under these circumstances, when the second virtualization storage device 2 is added to the storage system, and a part of the external volume 3A is transferred from the first virtualization storage device 1 to the second virtualization storage device 2, only the attribute information relating to such transferred external volume 3A is copied from the second management table 1C of the first virtualization storage device 1 to the second management table 2C of the second virtualization storage device 2.

Each external storage device 3 has at least one or more external volumes 3A. An external volume is a volume existing outside the respective virtualization storage devices 1, 2. Each external volume 3A, for example, is provided on a physical memory area of one or a plurality of memory apparatuses. As such memory apparatus, for instance, a hard disk drive, optical disk drive, semiconductor memory drive, tape drive and so on may be considered. Further, as the hard disk drive, for example, various disks such as a FC (Fibre Channel) disk, SAS (Serial Attached SCSI) disk and SATA (Serial AT Attachment) disk may be used. Each external volume 3A is connected to one of the logical volumes 1D, 2D via the intermediate volume 1E, 2E, and provides a memory area to the virtualization storage devices 1, 2.

The management terminal 7 is connected to both of the virtualization storage devices 1, 2 via the device-to-device LAN 8. The management terminal 7, for example, is configured as a personal computer, portable information terminal (including portable phones) or the like, and has a monitoring unit 7A. The monitoring unit 7A respectively monitors the load status of the respective virtualization storage devices 1, 2, and is able to display the monitoring result on a terminal screen.

As the load status, for instance, input/output per second (IOPS), CPU usage rate, cache memory usage rate and so on may be considered. A user such as a system administrator is able to comprehend the load status of the respective virtualization storage devices 1, 2 based on the monitoring result of the monitoring unit 7A, and thereby determine the disposition of the volumes.

Incidentally, at least a part of the judgment process by the user may be realized by a computer program, and the volume disposition may also be automatically conducted based on the load status of the respective virtualization storage devices 1, 2. The user's decision to transfer the volume is notified to the respective virtualization storage devices 1, 2 via the management terminal 7.

Next, the operation method of the storage system according to the present embodiment is explained. In the most initial state, only the respective external storage devices 3 exist in the storage system. Thereafter, the user introduces the first virtualization storage device 1 to the storage system, virtualizes the external volume 3A of the respective external storage devices 3 with the first virtualization storage device 1, and provides this to the respective hosts 4. Thereafter, for instance, four more hosts 4 are additionally increased, and, when the processing performance of the first virtualization storage device 1 is used up to its upper limit, the user decides the introduction of the second virtualization storage device 2. The user is able to decide the introduction of the second virtualization storage device 2 based on the monitoring result of the monitoring unit 7A (S0).

Then, the second virtualization storage device 2 is added to the storage system (S1). The user or a corporate engineer selling the second virtualization storage device 2 respectively connects the second virtualization storage device 2 to the upper level SAN and lower level SAN 6 (S2A, S2B). Further, the second virtualization storage device 2 is connected to the first virtualization storage device 1 via the device-to-device LAN 8 (S3).

Next, contents of the first management table 1B of the first virtualization storage device 1 are copied to the second virtualization storage device 2 (S4). Thereby, the first management table 2B is created in the second virtualization storage device 2.

The user selects the external volume 3A to be transferred from the first virtualization storage device 1 to the second virtualization storage device 2 based on the monitoring result of the monitoring unit 7A, and designates the transfer of the volume (S5).

Based on the designation from the management terminal 7, only the attribute information relating to the external volume 3A transferred to the second virtualization storage device 2 among the attribute information stored in the second management table 1C of the first virtualization storage device 1 is transferred from the first virtualization storage device 1 to the second virtualization storage device 2 (S6).

The second virtualization storage device 2 connects the external volume 3A designated by the management terminal 7 and the logical volume 2D by using the first management table 2B and second management table 2C (S7). And, the second virtualization storage device 2 sets information for making the host 4 recognize the logical volume 2D, and the host 4 sets a path for accessing this logical volume 2D (S8).

The data used by the host 4, in reality, is stored in a prescribed external volume 3A. Before the transfer of the volume, the host 4 is accessing a prescribed external volume 3A from the logical volume 1D of the first virtualization storage device 1 via the intermediate volume 1E. The host 4 is totally unaware that such data is stored in a prescribed external volume 3A.

When transferring such prescribed external volume 3A from the first virtualization storage device 1 to the second virtualization storage device 2, the second virtualization storage device 2 connects such prescribed external volume 3A to the logical volume 2D via the intermediate volume 2E. The host 4 is able to access this logical volume 2D by correcting the path information, and is thereby able to read and write desired data.

As described above, in the present embodiment, a plurality of virtualization storage devices 1, 2 may be used to virtualize and utilize the external volume 3A. And, the external volume 3A may be transferred between the respective virtualization storage devices 1, 2. Accordingly, the first virtualization storage device 1 and second virtualization storage device 2 can be used to disperse the processing load, and the processing performance of the storage system can be improved thereby. Thus, even when the demand of storage services increases, by appropriately adding virtualization storage devices, it will be possible to deal with such increased demand, and the usability can be improved.

Incidentally, it is not necessary to make the respective virtualization storage devices 1, 2 coexist, and, for instance, after transferring all external volumes 3A from the first virtualization storage device 1 to the second virtualization storage device 2, the first virtualization storage device 1 may be removed from the storage system. Embodiments of the present invention are now described in detail below.

1. First Embodiment

Figure 2:
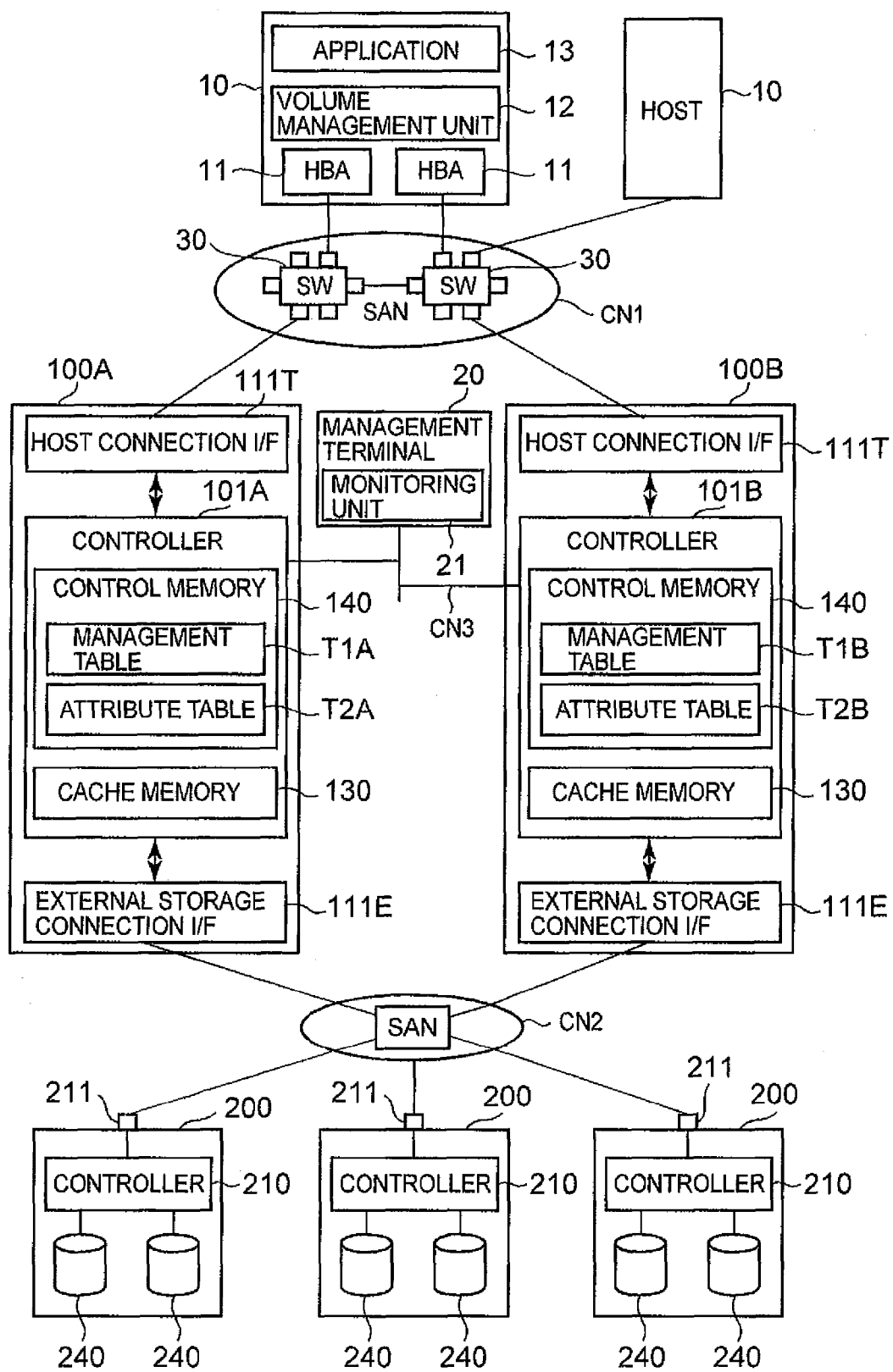
FIG. 2 is an explanatory diagram showing the schematic configuration of the storage system.

FIG. 2 is an explanatory diagram showing the overall schematic of the storage system according to the present embodiment. To foremost explain the correspondence with FIG. 1, the first virtualization storage device 100A illustrated in FIG. 2 corresponds to the first virtualization storage device 1 of FIG. 1, and the second virtualization storage device 100B corresponds to the second virtualization storage device 2 of FIG. 1. Similarly, the external storage device 200 illustrated in FIG. 2 corresponds to the external storage device 3 of FIG. 1, the host 10 of FIG. 2 corresponds to the host 4 of FIG. 1, and the management terminal 20 of FIG. 2 corresponds to the management terminal 7 of FIG. 1. The communication network CN1 of FIG. 2 corresponds to the upper level SAN 5 of FIG. 1, the communication network CN2 of FIG. 2 corresponds to the lower level SAN 6 of FIG. 1, and the communication network CN3 of FIG. 2 corresponds to the device-to-device LAN 8 of FIG. 1.

To foremost explain the network configuration of the storage system, the respective hosts 10 are respectively connected to the respective virtualization storage devices 100A, 100B via the upper level network CN1. The respective virtualization storage devices 100A, 100B are respectively connected to the respective external storage device 200 via the lower level network CN2. And, the respective virtualization storage devices 100A, 100B and the management terminal 20 are connected via the management network CN3. For example, the communication network CN1, CN2 may be configured as an IP_SAN or FC_SAN. Further, for instance, the communication network CN3 may be configured as a LAN. Nevertheless, the management communication network CN3 may be abolished, and either or both the upper level network CN1 and lower level network CN2 may be used to transfer information for managing the storage system.

The schematic configuration of the storage system is now explained. The host 10, for example, may be configured by having an HBA (Host Bus Adapter) 11, a volume management unit 12, and an application program 13 (abbreviated as "application" in the diagrams). When the upper level network CN1 is configured as an IP_SAN, in substitute for the HBA 11, for instance, a LAN card equipped with a TCP/IP offload engine may be used. The volume management unit 12 manages the path information and the like to the volume to be accessed.

The first virtualization storage device 100A, for example, may be configured by having a host connection interface (abbreviated as "I/F" in the drawings) 111T, a controller 101A, and an external storage connection interface 111E. Incidentally, although the first virtualization storage device 100A has a logical volume 164 as described later, the hierarchical memory configuration will be described later together with FIG. 4.

The host connection interface 111T is used for connecting to the respective hosts 10 via the upper level communication network CN1. The external storage connection interface 111E is used for connecting to the respective external storage devices 200 via the lower level communication network CN2.

The controller 101A is used for controlling the operation of the first virtualization storage device 100A. Although details of the controller 101A will be described in detail later, the controller 101A, for instance, may be configured by having one or a plurality of microprocessors, memory, data processing circuit and the like. A management table T1A and attribute table T2A are respectively stored in the control memory 140 used by the controller 101A. The management table T1A corresponds to the first management table 1B of FIG. 1, and the attribute table T2A corresponds to the second management table 1C of FIG. 1. These management tables T1A, T2A will be described in detail later. Write data and the like written from the host 10 is stored in the cache memory 130 used by the controller 101A.

The second virtualization storage device 100B, as with the first virtualization storage device 100A, may be configured by having a host connection interface 111T, a controller 101B, and an external storage connection interface 111E. And, a management table T1B and attribute table T2B are stored in the control memory 140 used by the controller 101B.

The respective external storage devices 200, for example, may be configured by respectively having a controller 210, a communication port 211, and a logical volume 240. Since the logical volume 240 is a volume existing outside the respective virtualization storage devices 100A, 100B, this is sometimes referred to as an external volume in the present specification.

The management terminal 20, for instance, is configured as a personal computer, workstation, portable information terminal or the like, and has a monitoring unit 21. The monitoring unit 21 respectively acquires the load status of the respective virtualization storage devices 100A, 100B, and displays the acquired load status on a terminal screen.

Incidentally, reference numeral 30 in FIG. 2 represents a switch. In FIG. 2, although the switch 30 is only shown in the upper level network, one or a plurality of such switches may also be provided to the lower level network CN2.

Figure 3:
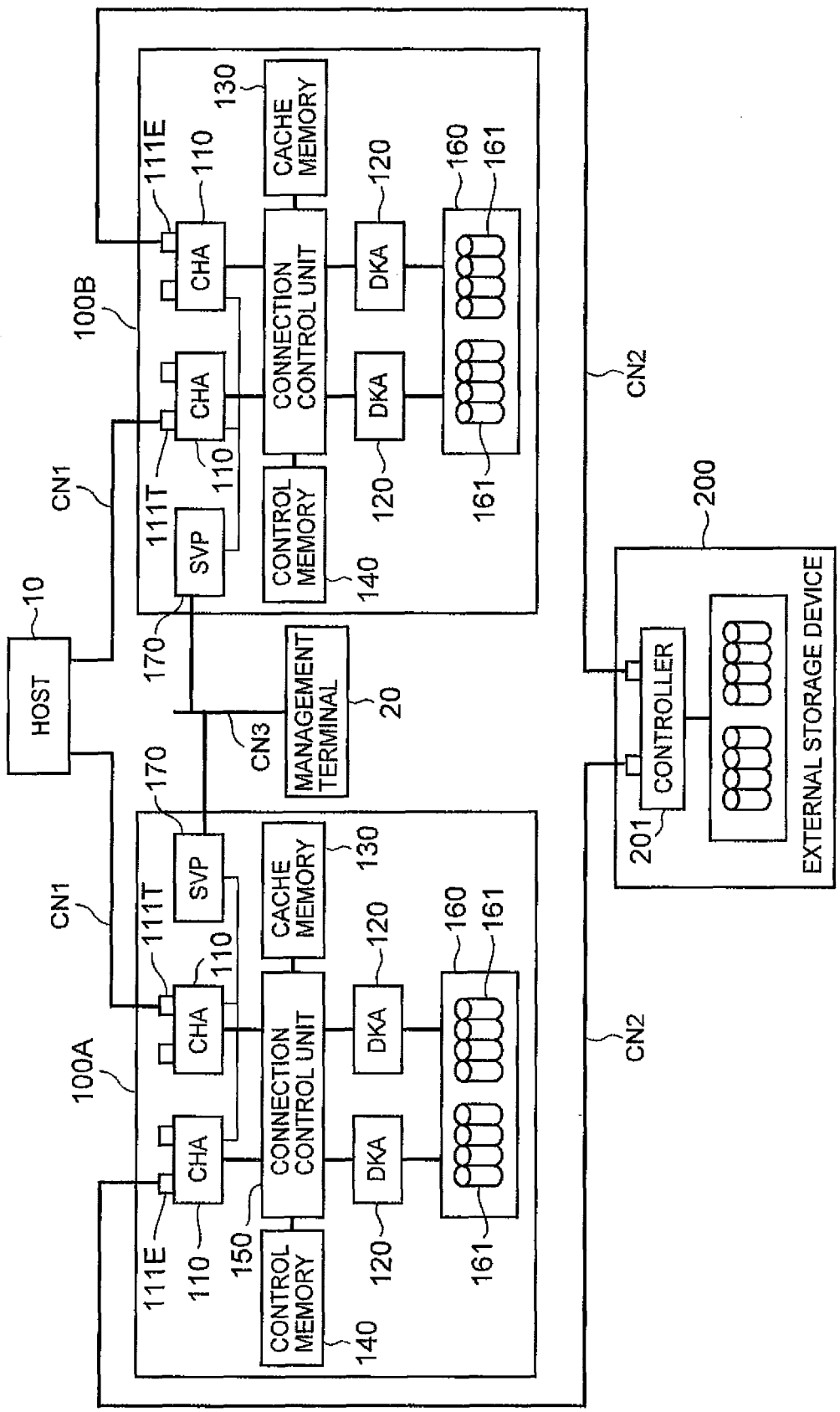
FIG. 3 is a block diagram showing the hardware configuration of the storage system.

FIG. 3 is an explanatory diagram showing the detailed hardware configuration of the respective virtualization storage devices 100A, 100B. To explain the first virtualization storage device 100, the first virtualization storage device 100A, for instance, may be configured by having a plurality of channel adapters (hereinafter referred to as a "CHA") 110, a plurality of disk adapters (hereinafter referred to as a "DKA") 120, a cache memory 130, a control memory 140, a connection control unit 150, a memory unit 160, and a service processor (hereinafter abbreviated as "SVP") 170.

Each CHA 110 performs data communication with the host 10. Each CHA 110 may have at least one or more communication interfaces 111T for communicating with the host 10. Each CHA 110 may be configured as a microcomputer system equipped with a CPU, memory and so on. Each CHA 110 interprets and executes the various commands such as a read command or write command received from the host 10.

Each CHA 110 is assigned a network address (e.g., IP address or WWN) for identifying the respective CHAs 110, and each CHA 110 may also individually function as a NAS (Network Attached Storage). When there is a plurality of hosts 10, each CHA 110 receives and processes the request from each host 10 individually. Among the respective CHAs 110, a prescribed CHA 110 is provided with an interface (target port) 111T for communicating with the host 10, and the other CHAs 110 are provided with an interface (externally connected port) 111E for communicating with the external storage device 200.

Each DKA 120 is used for transferring data to and from the disk drive 161 of the memory unit 160. Each DKA 120, as with the CHA 110, is configured as a microcomputer system equipped with a CPU, memory and so on. Each DKA 120, for example, is able to write data that the CHA 110 received from the host 10 or data read from the external storage device 200 into a prescribed disk drive 161. Further, each DKA 120 is also able to read data from a prescribed disk drive 161 and transmit this to the host 10 or external storage device 200. When inputting and outputting data to and from the disk drive 161, each DKA 120 converts a logical address into a physical address.

When the disk drive 161 is managed according to RAID, each DKA 120 performs data access according to such RAID configuration. For example, each DKA 120 respectively writes the same data in separate disk drive groups (RAID groups) (RAID 1, etc.),) or executes a parity account and writes the data and parity in the disk drive group (RAID 5, etc.). Incidentally, in the present embodiment, the respective virtualization storage devices 100A, 100B virtualize and incorporate the external volume 240 of the external storage device 200, and provides this to the host 10 as though it is one's own internal volume.

Therefore, the respective virtualization storage devices 100A, 100B do not necessarily have to have a memory unit 160. The respective virtualization storage devices 100A, 100B are used to virtualize and utilize the external volume 240. When the respective virtualization storage devices 100A, 100B do not have a memory unit 160, the DKA 120 will not be required. Incidentally, the configuration may also be such that one virtualization storage device has a memory unit 160, and the other virtualization storage device does not have a memory unit 160.

The cache memory 130 stores the data received from the host 10 or external storage device 200. Further, the cache memory 130 stores data read from the disk drive 161. As described later, the memory space of the cache memory 130 is used to create a virtual, intermediate memory apparatus (V-VOL).

The control memory 140 stores various types of control information to be used in the operation of the virtualization storage device 100A. Further, a work area is set in the control memory 140, and various tables described later are also stored therein.

Incidentally, one or a plurality of disk drives 161 may be used as the cache disk. Further, the cache memory 130 and control memory 140 may be configured to be separate memories, or a part of the memory area of the same memory may be used as the cache area, and the other memory area may be used as the control area.

The connection control unit 150 mutually connects the respective CHAs 110, respective DKAs 120, cache memory 130 and control memory 140. The connection control unit 150, for instance, can be configured as a crossbar switch or the like.

The memory unit 160 has a plurality of disk drives 161. As the disk drive 161, for example, various memory apparatuses such as a hard disk drive, flexible disk drive, magnetic tape drive, semiconductor memory drive and optical disk drive as well as the equivalents thereof may be used. Further, for instance, different types of disks such as a FC (Fibre Channel) disk and a SATA (Serial AT Attachment) disk may coexist in the memory unit 160.

The service processor (SVP) 170 is respectively connected to each CHA 110 via an internal network such as a LAN. The SVP 170 is able to send and receive data to and from the control memory 140 or DKA 120 via the CHA 110. The SVP 170 extracts various types of information in the first virtualization storage device 100A and provides this to the management terminal 20.

Since the second virtualization storage device 100B can also be configured the same as the first virtualization storage device 100A, the explanation thereof is omitted. Nevertheless, the respective virtualization storage devices 100A, 100B do not have to be configured the same.

The external storage device 200 may be configured approximately the same as the virtualization storage devices 100A, 100B, or may be configured more simple than the respective virtualization storage devices 100A, 100B.

Here, care should be given to the network configuration of the storage system. As described above, the upper level network CN1 connecting the host 10 and respective virtualization storage devices 100A, 100B and the lower level network CN2 mutually connecting the respective storage devices 100A, 100B, 200 are respectively configured as a separate communication network. Therefore, large quantities of data can be transferred with the lower level network CN2 without directly influencing the upper level network CN1.

Figure 4:
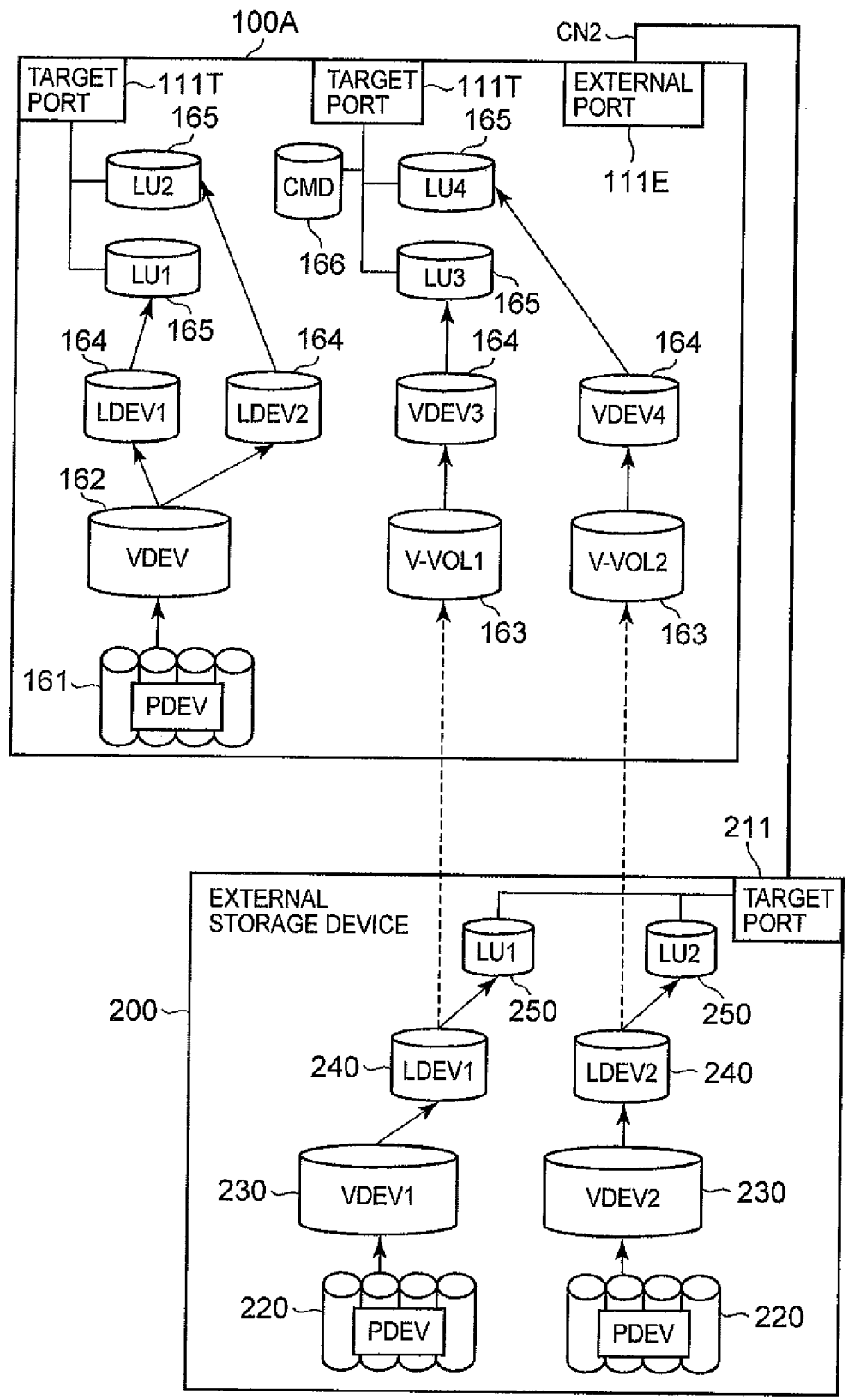
FIG. 4 is an explanatory diagram showing the frame format of the memory configuration of the storage system.

Explanation is not provided with reference to FIG. 4. FIG. 4 is an explanatory diagram showing the memory configuration of the storage system. Foremost, the configuration of the virtualization storage devices 100A, 100B is explained taking the first virtualization storage device 100A as an example.

The memory configuration of the first virtualization storage device 100A, for example, can be broadly classified into a physical memory hierarchy and a logical memory hierarchy. The physical memory hierarchy is configured from a PDEV (Physical Device) 161, which is a physical disk. PDEV corresponds to the foregoing disk drive 161.

The logical memory hierarchy may be configured from a plurality of (e.g., two types of) hierarchies. One logical hierarchy may be configured from a VDEV (Virtual Device) 162, and a virtual VDEV (hereinafter sometimes referred to as "V-VOL") 163 which is treated like the VDEV 162. The other logical hierarchy may be configured from a LDEV (Logical Device) 164.

The VDEV 162, for example, is configured by grouping a prescribed number of PDEVs 161 such as in a set of fours (3D+1P), or a set of eights (7D+1P). The memory areas provided respectively from each PDEV 161 belonging to the group are assembled to form a single RAID storage area. This RAID memory area becomes the VDEV 162.

In contrast to the VDEV 162 being created on a physical memory area, the V-VOL 163 is a virtual intermediate memory apparatus that does not require a physical memory area. The V-VOL 163 is not directly associated with a physical memory area, and is a virtual existence to become the receiver for mapping an LU (Logical Unit) of the external storage controller device 200. This V-VOL 163 corresponds to an intermediate volume.

At least one or more LDEVs 164 may be provided on the VDEV 162 or V-VOL 163. The LDEV 164, for instance, may be configured by dividing the VDEV 162 in a fixed length. When the host 10 is an open host, by the LDEV 164 being mapped with the LU 165, the host 10 will recognize the LDEV 164 as a single physical disk. An open host can access a desired LDEV 164 by designating the LUN (Logical Unit Number) or logical block address. Incidentally, a mainframe host will directly recognize the LDEV 164.

The LU 165 is a device that can be recognized as a logical unit of SCSI. Each LU 165 is connected to the host 10 via the target port 111T. At least one or more LDEVs 164 may be respectively associated with each LU 165. Incidentally, as a result of associating a plurality of LDEVs 164 to a single LU 165, the LU size can be virtually expanded.

A CMD (Command Device) 166 is a dedicated LU to be used for transferring commands and statuses between the I/O control program operating on the host 10 and the storage device 100.

For example, a command from the host 10 is written in the CMD 166. The first virtualization storage device 100 executes the processing according to the command written in the CMD 166, and writes the execution result thereof as the status in the CMD 166. The host device 10 reads and confirms the status written in the CMD 166, and writes the processing contents to be executed subsequently in the CMD 166. As described above, the host device 10 is able to give various designations to the first virtualization storage device 100A via the CMD 166.

Incidentally, the command received from the host device 10 may also be processed directly by the first virtualization storage device 100A without being stored in the CMD 166. Moreover, the CMD may be created as a virtual device without defining the actual device (LU) and configured to receive and process the command from the host device 10. In other words, for example, the CHA 110 writes the command received from the host device 10 in the control memory 140, and the CHA 110 or DKA 120 processes this command stored in the control memory 140. The processing results are written in the control memory 140, and transmitted from the CHA 110 to the host device 10.

An external storage device 200 is connected to an initiator port (External Port) 111E for external connection of the first virtualization storage device 100A via the lower level network CN2.

The external storage device 200 has a plurality of PDEVs 220, a VDEV 230 set on a memory area provided by the PDEV 220, and one or more LDEVs 240 that can be set on the VDEV 230. And, each LDEV 240 is respectively associated with the LU 250. The PDEV 220 corresponds to the disk drive 220 of FIG. 3. The LDEV 240 corresponds to a "separate logical volume", and corresponds to the external volume 3A of FIG. 1.

The LU 250 (i.e., LDEV 240) of the external storage device 200 is mapped to the V-VOL 163. For example, the "LDEV 1", "LDEV 2" of the external storage device 200 are respectively mapped to the "V-VOL 1", "V-VOL 2" of the first virtualization storage device 100A via the "LU 1", "LU 2" of the external storage device 200. And, "V-VOL 1", "V-VOL 2" are respectively mapped to the "LDEV 3", "LDEV 4", and the host device 10 is thereby able to use these volumes via the "LU 3", "LU 4".

Incidentally, the VDEV 162, V-VOL 163 may adopt the RAID configuration. In other words, a single disk drive 161 may be assigned to a plurality of VDEVs 162, V-VOLs 163 (slicing), and a single VDEV 162, V-VOL 163 may be formed from a plurality of disk drives 161 (striping).

Since the second virtualization storage device 100B may have the same hierarchical memory configuration as the first virtualization storage device 100A, the explanation thereof is omitted.

FIG. 5 is an explanatory diagram showing the schematic configuration of the management table T1A and attribute table T2A used by the first virtualization storage device 100A. Each of these tables T1A, T2A may be stored in the control memory 140.

The management table T1A is used for uniformly managing the respective external volumes 240 dispersed in the storage system. The management table T1A, for instance, may be configured by respectively associating a network address (WWN: World Wide Name) for connected to the respective external volumes 240, a number (LUN: Logical Unit Number) of the respective external volumes 240, volume size of the respective external volumes 240, an external volume number, owner right information and transfer status flag.

Here, an external volume number is identifying information for uniquely specifying the respective external volumes 240 in the storage system. Owner right information is information for specifying the virtualization storage devices having the authority to use such external volume. When "0" is set in the owner right information, it shows that such external volume 240 is unused. When "1" is set in the owner right information, it shows that one's own device has the usage authorization to use such external volume 240. Further, when "−1" is set in the owner right information, it shows that the other virtualization storage devices have the usage authorization to use such external volume 240.

Specifically, with respect to the external volume 240 to which "1" is set in the owner right information in the management table T1A used by the first virtualization storage device 100A, the first virtualization storage device 100A has the usage authorization thereof. Similarly, with respect to the external volume 240 to which "−1" is set in the management table T1A, the second virtualization storage device 100B has the usage authorization thereof. As described above, when the owner right information is set as "1" in one management table regarding a certain external volume 240, the ownership right information of such external volume is set to "−1" in the other management table. By referring to the owner right information, whether such external volume is under the control of one of the virtualization storage devices, or is an unused volume can be known.

Incidentally, in the present embodiment, since only two virtualization storage devices 100A, 100B are shown, by setting either "1" or "−1" in the owner right information, the affiliation of such external volume 240 can be specified. In addition to the above, if there are three or more virtualization storage devices in the storage system, as the owner right information, for instance, the case number assigned to the respective virtualization storage devices may also be set. In other words, identifying information capable of uniquely specifying the respective virtualization storage devices in the storage system may be used as the owner right information.

The transfer status flag is information showing that the external volume 240 is being transferred from one virtualization storage device to the other virtualization storage device.

When "1" is set in the transfer status flag, this shows that the owner right of such external volume 240 is being changed. Meanwhile, when "0" is set in the transfer status flag, this shows that such external volume 240 is in a normal state, and the owner right is not being changed.

The attribute table T2A is a table for managing various types of attribute information of the respective external volumes 240. The attribute table T2A, for example, may be configured by associating the LU number of the respective external volumes 240, path definition information, replication configuration information, replication status information, and replication bitmap information.

Path definition information is information for showing, via which port of which CHA 110, the logical volume 164 connected to such external volume 240 is to be accessed by the host 10. A plurality of paths may be set in the path definition information. One path is the normally used primary path, and the other path is an alternate path to be used when there is failure in the primary path.

The replication configuration information is information showing the correspondence of the volumes configuring a copy-pair. A volume in which "P" is set in the replication configuration information is a primary volume (copy source volume), and a volume in which "S" is set in the replication configuration information is a secondary volume (copy destination volume). Incidentally, the numbers appended to "P" and "S" are serial numbers for identifying the respective copy-pairs.

The replication status information is information showing the status of the respective volumes configuring the copy-pair. When "Pair" is set in the replication status information, the volume thereof is in synchronization with the volume of the other party, and shows that the respective volumes forming the copy-pair are maintaining the same memory contents. When "Resync" is set in the replication status information, this shows that the volume thereof and the volume of the other party are in resynchronization. When "Simplex" is set in the replication status information, this shows that the volume thereof is not a target of replication. When "Suspend" is set in the replication status information, this shows that the volume thereof has not been updated with the volume of the other party.

The replication bitmap information is information showing the updated position of the data in the volume thereof. For example, a flag showing whether the data has been updated is prepared for each segment, and this means that, in a segment with "1" set to the flag, the data thereof has been updated. For example, when managing the existence of the update of data regarding a logical volume 164 having a volume size of 1TB in a segment size of 1 MB, the size of the replication bitmap information will be 128 KB. When the first virtualization storage device 100A is able to set n number of logical volumes 164, the total size of the replication bitmap information will be n×128 KB. When n is 16384, the total size of the replication bitmap information will be 16384×128 KB=2048 MB.

As described above, when only focusing attention on the replication bitmap information, the table size of the attribute table T2A will be enormous. According, when the entirety of this attribute table T2A is to be transferred to the second virtualization storage device 100B, the control memory 140 of the second virtualization storage device 100B will be compressed. Thus, in the present embodiment, among the information stored in the attribute table T2A, only the information relating to the volume to be transferred to the second virtualization storage device 100B is transferred to the second virtualization storage device 100B. In other words, attribute information is transferred to the necessary extent. Thereby, the data volume to be transferred can be reduced, the time required for creating the attribute table can be shortened, and the compression of the memory resource (control memory 140) of the second virtualization storage device 100B, which is the transfer destination, can be prevented.

Incidentally, in addition to the foregoing items, for instance, information such as the device type (disc device or tape device, etc.), vendor name, identification number of the respective storage devices and so on may also be managed. Such information may be managed with either the management table T1A or attribute table T2A.

Figure 6:
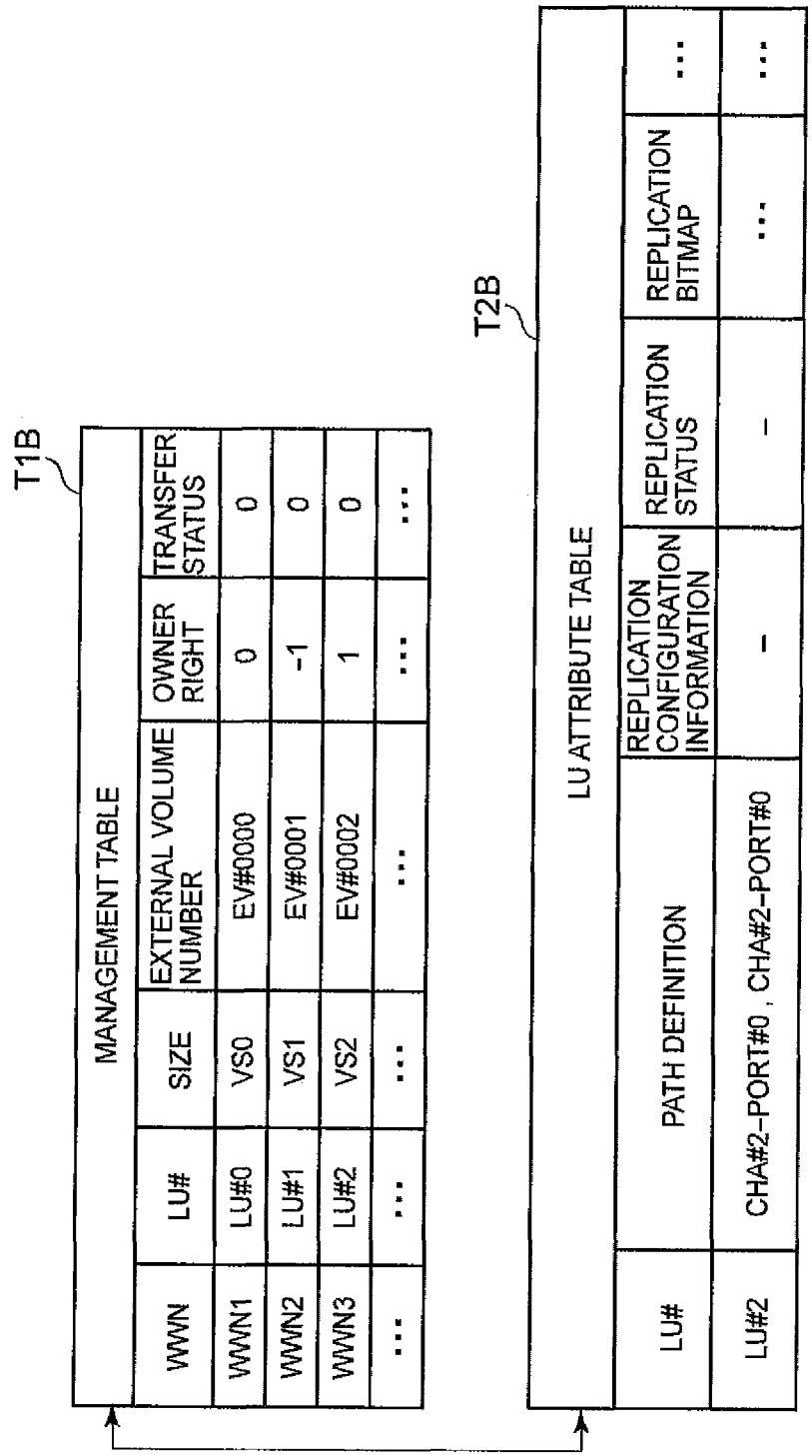
FIG. 6 is an explanatory diagram showing the respective configurations of the management table and attribute table to be used by a second virtualization storage device.

FIG. 6 is an explanatory diagram showing the schematic configuration of the management table T1B and attribute table T2B used by the second virtualization storage device 100B. The management table T1B, as with the management table T1A described above, for instance, is configured by associating a network address such as WWN, an LU number, volume size, an external volume number, owner right information and a transfer status flag. The management table T1A and management table T1B are configured the same excluding the owner right information.

The attribute table T2B, as with the attribute table T2A described above, is also configured by associating an LU number, path definition information, replication configuration information, replication status information and replication bitmap information. Nevertheless, as described above, in order to effectively use the memory resource of the second virtualization storage device 100B, it should be noted that only the attribute information of the volume under the control of the second virtualization storage device 100B is registered in the management table T2B.

Figure 7:
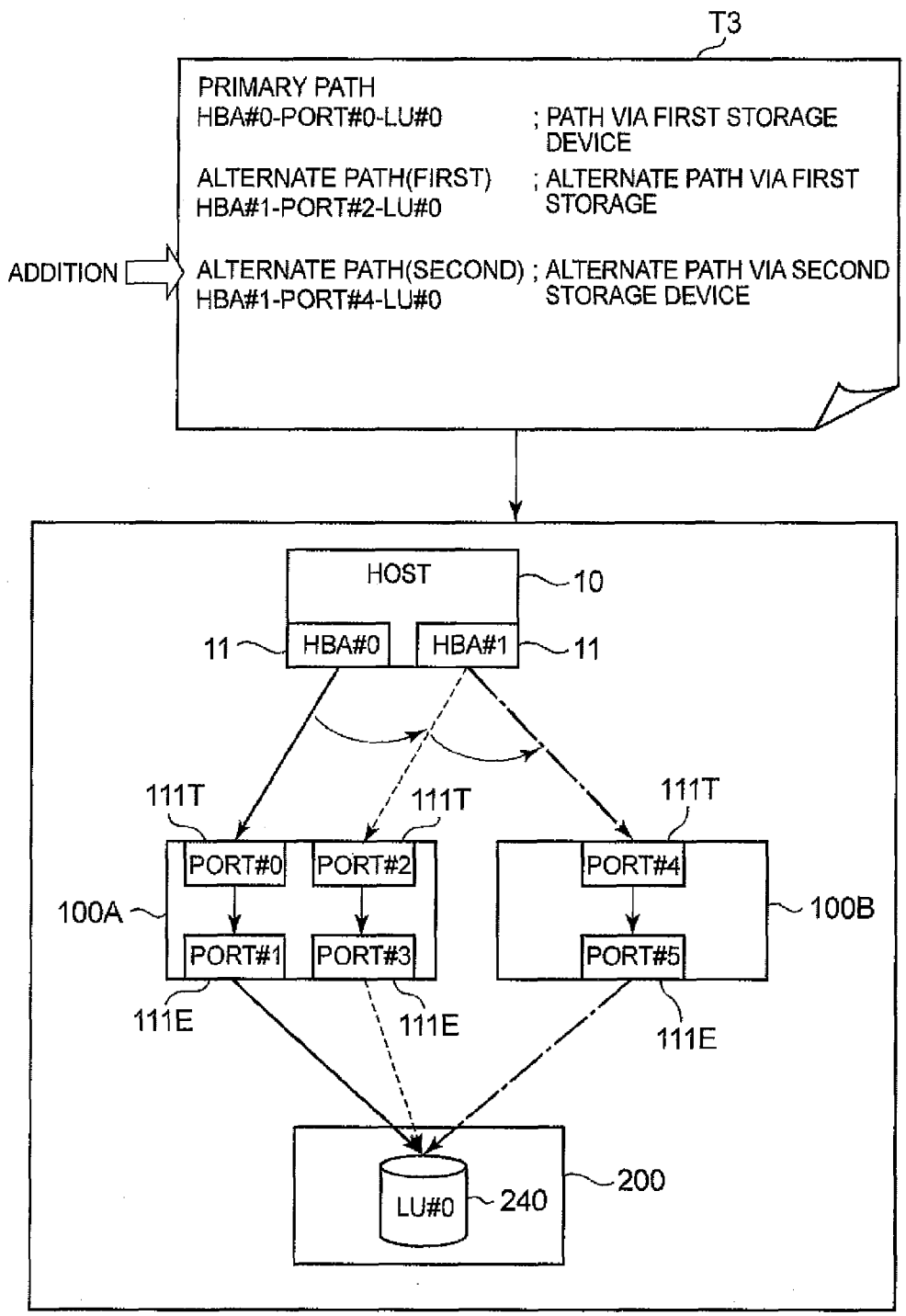
FIG. 7 is an explanatory diagram showing the configuration of the path definition information and the situation of the host path being switched based on this path definition information.

FIG. 7 is an explanatory diagram showing the schematic configuration of the path setting information T3 to be used by the volume management unit 12 of the host 10. This path setting information T3 may be stored in the memory of the host 10 or a local disk.

The path setting information T3 includes information relating to the primary path to be used in normal times, and information relating to the alternate path to be used in abnormal times. Each path, for instance, is configured by including information for specifying the HBA 11 to be used, port number of the access destination, and LU number for identifying the volume of the access target.

Although a plurality of alternate paths is described in the path setting information T3, the alternate path described first is a normal alternate path, and the subsequently described alternate path is a path unique to the present embodiment. In other words, the second alternate path is a path set upon transferring the volume from the first virtualization storage device 100A to the second virtualization storage device 100B.

The lower part of FIG. 7 shows a frame format of the situation of switching from the primary path to the alternate path. Here, explained is a case where the volume 420 of "#0" is transferred from the first virtualization storage device 100A to the second virtualization storage device 100B.

Before the transfer, by accessing the Port #0 from the HBA #0 as shown with the thick line in FIG. 7, the host 10 is able to read and write data from and into the logical volume of the first virtualization storage device 100A. In the first virtualization storage device 100A, the external volume 240 is accessed from the Port #1 based on the access from the host 10.

When transferring the volume, information for the host 10 to access the transferred volume is added to the path setting information T3 as the second alternate path. And, the first virtualization storage device 100A rejects the access request regarding the transferred volume.

Therefore, even if the host 10 tries to access the transferred volume via the primary path shown with the thick line in FIG. 7, such access will be rejected by the first virtualization storage device 100A. Thus, the host 10 tries re-accessing such transferred volume by switching to the first alternate path (HBA #1→Port #2→LU #0) shown with the dotted line in FIG. 7. Nevertheless, this access is also rejected by the first virtualization storage device 100A.

Then, the host 10 tries to access the volume by switching to the second alternate path (HBA #1→Port #4→LU #0) shown with the dashed line in FIG. 7. The second alternate path is a path to the second virtualization storage device 100B, which is the volume transfer destination. When the access request from the host 10 is in a processible state, the second virtualization storage device 100B processes this access request, and returns the processing result to the host 10. The processible state of the access request means that even when the access request from the host 10 is processed, inconsistency in the data stored in the volume will not occur. This will be described in detail later.

As described above, when the host 10 is unsuccessful in accessing via the primary path, it switches to the first alternate path, and, when it is unsuccessful in accessing via the first alternate path, it switches to the second alternate path. Accordingly, until the access request of the host 10 is accepted, some time (path switching time) will be required. Nevertheless, this path switching time is not wasteful time. This is because, as described later, destage processing to the transferred volume can be performed during such path switching time. In the present embodiment, merely by adding a new path to the path setting information T3 stored in the host 10, the access destination of the host 10 can be switched.

Figure 8:
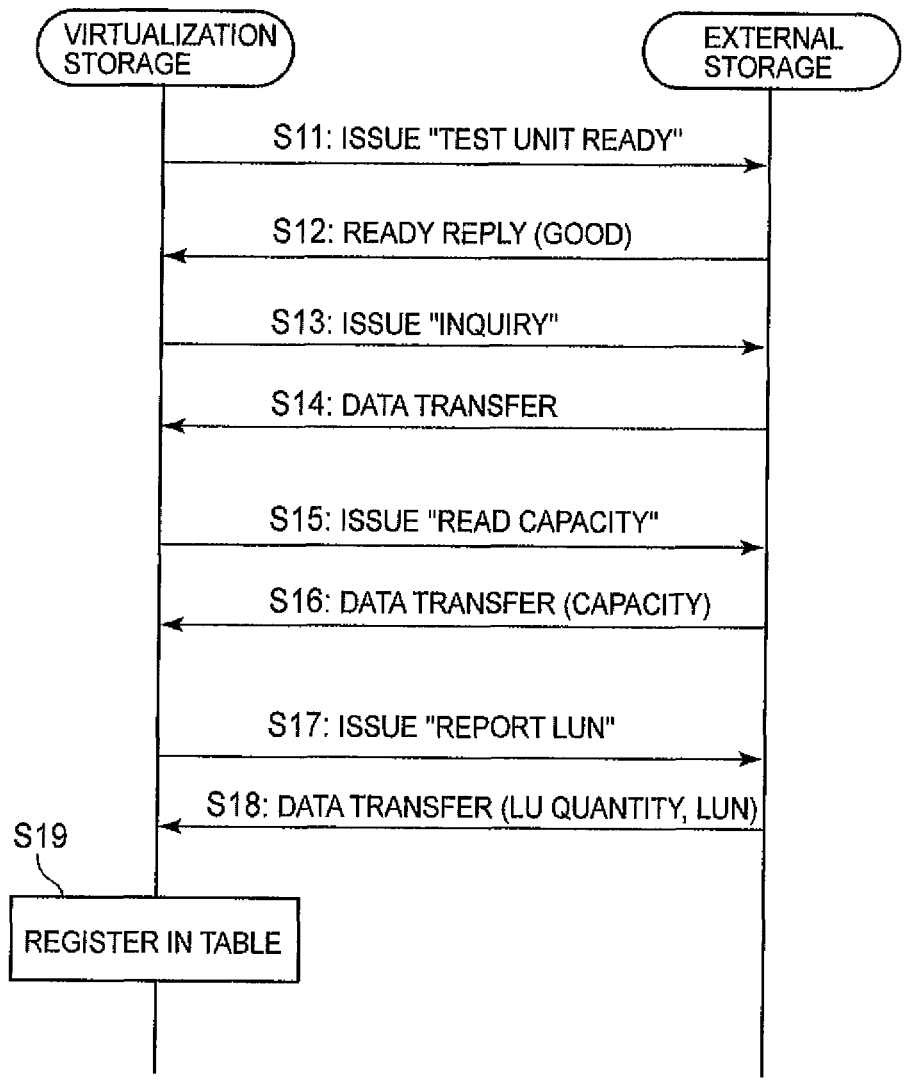

FIG. 8 is a flowchart showing the outline of the processing for searching the external volume existing in the storage system and registering this in the management table T1A. Here, an example of a case where the first virtualization storage device 100A executes the processing is explained.

Foremost, the first virtualization storage device 100A issues a command ("Test Unit Ready") toward the respective external storage devices 200 for confirming the existence thereof (S11). Each external storage device 200 operating normally will return a Ready reply having a Good status as the response to such command (S12).

Next, the first virtualization storage device 100A issues an "Inquiry" command to each external storage device 200 in which the existence thereof has been confirmed (S13). Each external storage device 200 that received this command, for instance, transmits information regarding the device type and so on to the first virtualization storage device 100A (S14).

The first virtualization storage device 100A issues a "Read Capacity" command to each external storage device 200 (S15). Each external storage device 200 transmits the size of the external volume 240 to the first virtualization storage device 100A (S16).

The first virtualization storage device 100A transmits a "Report LUN" command to each external storage device 200 (S17). Each external storage device 200 transmits the LUN quantity and LUN number to the first virtualization storage device 100A (S18).

The first virtualization storage device 100A registers the information acquired from each external storage device 200 in the management table T1A and attribute table T2A, respectively. As described above, the first virtualization storage device 100A is able to respectively create the management table T1A and attribute table T2A by issuing a plurality of inquiry commands.

Incidentally, the configuration of the storage system may change by one of the external storage devices 200 being removed, or a new external storage device 200 being added. When the configuration of the storage system is changed, for example, the first virtualization storage device 100A is able to detect such change in configuration based on command and notifications such as RSCN (Registered State Change Notification), LIP (Loop Initialization Primitive), SCR (State Change Registration) or SCN (State Change Notification). Incidentally, the foregoing processing may also be executed by the second virtualization storage device 100B.

Next, the method of the virtualization storage devices 100A, 100B using the external volume 240 to process the access request from the host 10 is explained. Here, although explained is a case where the first virtualization storage device 100A processes the access request, the second virtualization storage device 100B may also perform the same processing. Foremost, the processing method of a write command is explained. As the method for processing the write command, two methods; namely, the synchronous transfer mode and asynchronous transfer mode may be considered.

In the case of the synchronous transfer mode, when the first virtualization storage device 100A receives a write command from the host 10, the first virtualization storage device 100A stores the write data received from the host 10 in the cache memory 130, and thereafter transfers the write data to the external storage device 200 via the communication network CN2. When the external storage device 200 receives the write data and stores this in the cache memory, it transmits a reply signal to the first virtualization storage device 100A. When the first virtualization storage device 100A receives the reply signal from the external storage device 200, it transmits a write completion report to the host 10.

As described above, in the synchronous transfer mode, after the write data is transferred to the external storage device 200, the completion of the write command processing is notified to the host 10. Accordingly, in the synchronous transfer mode, a delay will arise in the time of waiting for the reply from the external storage device 200. Thus, the synchronous transfer mode is suitable in cases where the distance between the first virtualization storage device 100A and external storage device 200 is relatively short. Contrarily, if the first virtualization storage device 100A and external storage device 200 are far apart, generally speaking, the synchronous transfer mode is not suitable due to problems of delays in reply and delays in propagation.

Contrarily, in the case of an asynchronous transfer mode, when the first virtualization storage device 100A receives a write command from the host 10, it stores the write data in the cache memory 130, and thereafter immediately issues a write completion report to the host 10. After issuing the write completion report to the host 10, the first virtualization storage device 100A transfers the write data to the external storage device 200. The write completion report to the host 10 and the data transfer to the external storage device 200 are conducted asynchronously. Accordingly, in the case of the asynchronous transfer mode, the write completion report can be transmitted to the host 10 quickly irrelevant to the distance between the first virtualization storage device 100A and external storage device 200. Thus, the asynchronous transfer mode is suitable when the distance between the first virtualization storage device 100A and external storage device 200 is relatively long.

Figure 9:
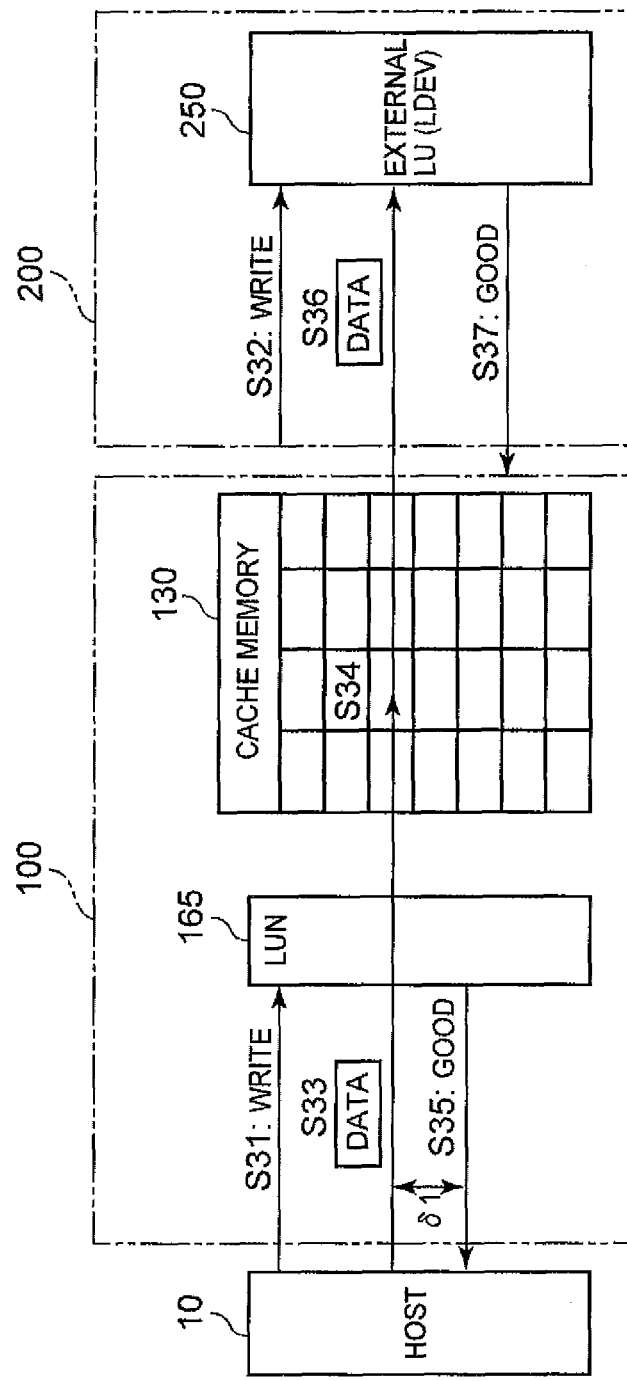
FIG. 9 is an explanatory diagram showing the processing in the case of operating in the asynchronous transfer mode.
Figure 10:
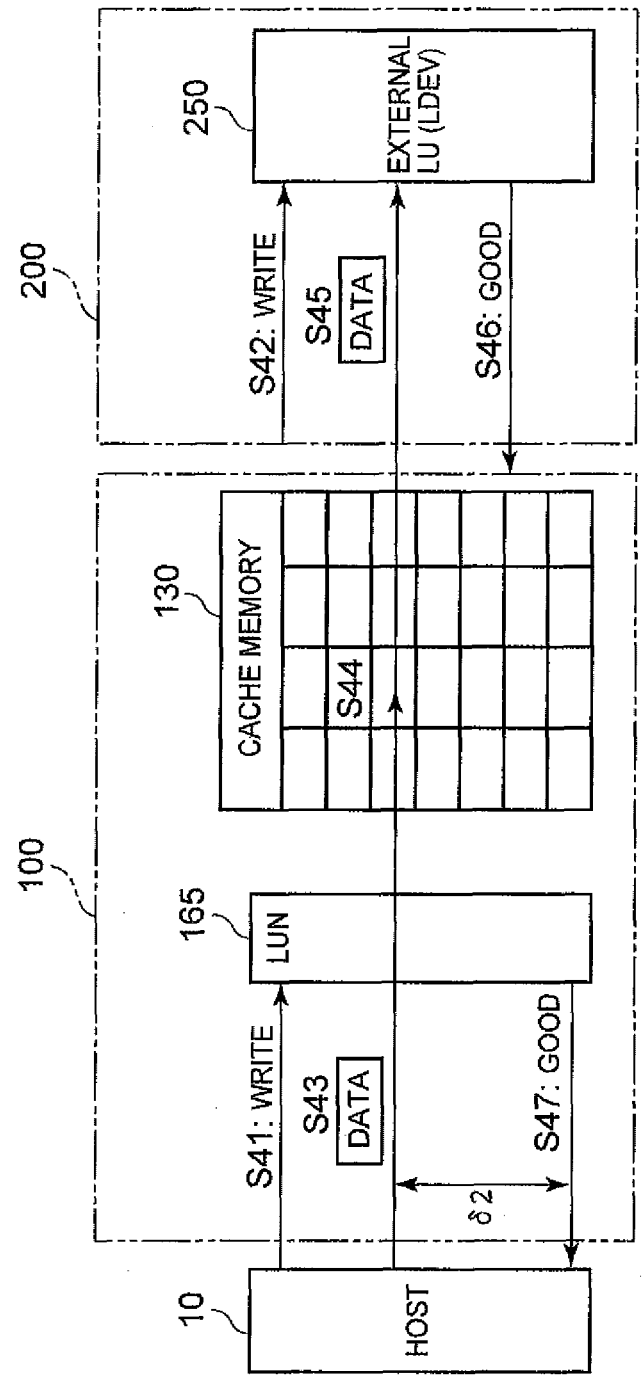
FIG. 10 is an explanatory diagram showing the processing in the case of operating in the synchronous transfer mode.

FIG. 9 is an explanatory diagram showing the case of the asynchronous transfer mode. In FIG. 9 and FIG. 10, the virtualization storage devices 100A, 100B are not differentiated, and will be referred to as the "virtualization storage device 100". Further, the management tables T1A, T1B are not differentiated, and will be referred to as the "management table T1".

The host 10 issues a write command to a prescribed LU 165 of the virtualization storage devices 100 (S31). The LU 165 is associated with the LU 250 of the external storage device 200 via the V-VOL 163. The LU 165 of the virtualization storage devices 100 is an access target from the host 10, but the external LU 250 is actually storing the data. Therefore, for instance, the LU 165 may be referred to as an "access destination logical memory apparatus" and the LU 250 may be referred to as a "data storage destination logical memory apparatus", respectively.

When the virtualization storage devices 100 receives a write command from the host 10, it specifies the LU targeted by such write command, refers to the management table T1 and determines whether this LU is associated with an external volume. When this is a write command to an LU associated with an external volume, the virtualization storage device 100 transmits a write command to the external storage device 200 having such external volume (S32).

After the write command is issued, the host 10 transmits the write data with the LU 165 as the write target to the virtualization storage devices 100 (S33). The virtualization storage device 100 temporarily stores the write data received from the host 10 in the cache memory 130 (S34). After the virtualization storage device 100 stores the write data in the cache memory 130, it reports the completion of writing to the host 10 (S35).

After converting the address and so on, the virtualization storage device 100 transmits the write data stored in the cache memory 130 to the external storage device 200 (S36). The external storage device 200 stores the write data received from the virtualization storage device 100 in the cache memory. And, the external storage device 200 reports the completion of writing to the virtualization storage device 100 (S37). The external storage device 200, for example, looks out for a period with few I/O, and writes the write data stored in the cache memory in the memory apparatus 220 (destage processing). In the asynchronous transfer mode, after write data is received from the host 10, the write completion can be sent to the host 10 in a short reply time $\delta 1$.

FIG. 10 shows a case of the synchronous transfer mode. Upon receiving the write command issued from the host 10 (S41), the virtualization storage device 100 specifies the external volume (LU 250) associated with the access destination volume (LU 165) of the write command, and issues a write command to such external volume (S42).

When the virtualization storage device 100 receives the write data from the host 10 (S43), it stores this write data in the cache memory 130 (S44). The virtualization storage device 100 transfers the write data stored in the cache memory 130 to the external storage device 200 such that it is written in the external volume (S45). After storing the write data in the cache memory, the external storage device 200 reports the completion of writing to the virtualization storage device 100 (S46). When the virtualization storage device 100 confirms the completion of writing in the external storage device 200, it reports the completion of writing to the host 10 (S47). In the synchronous transfer mode, since the report of the write completion to the host 10 is made upon waiting for the processing in the external storage device 200, the reply time $\delta 2$ will become long. The reply time $\delta 2$ of the synchronous transfer mode is longer than the reply time $\delta 1$ of the asynchronous transfer mode ($\delta 2 \geqq \delta 1$).

As described above, the respective virtualization storage devices 100A, 100B are able to incorporate and use the external volume 240 of the external storage device 200 as though it is a virtual internal volume.

Next, the method of transferring the external volume 240 being used by the first virtualization storage device 100A to the second virtualization storage device 100B is explained. Incidentally, the external volume 240 may also be transferred from the second virtualization storage device 100B to the first virtualization storage device 100A.

Figure 11:
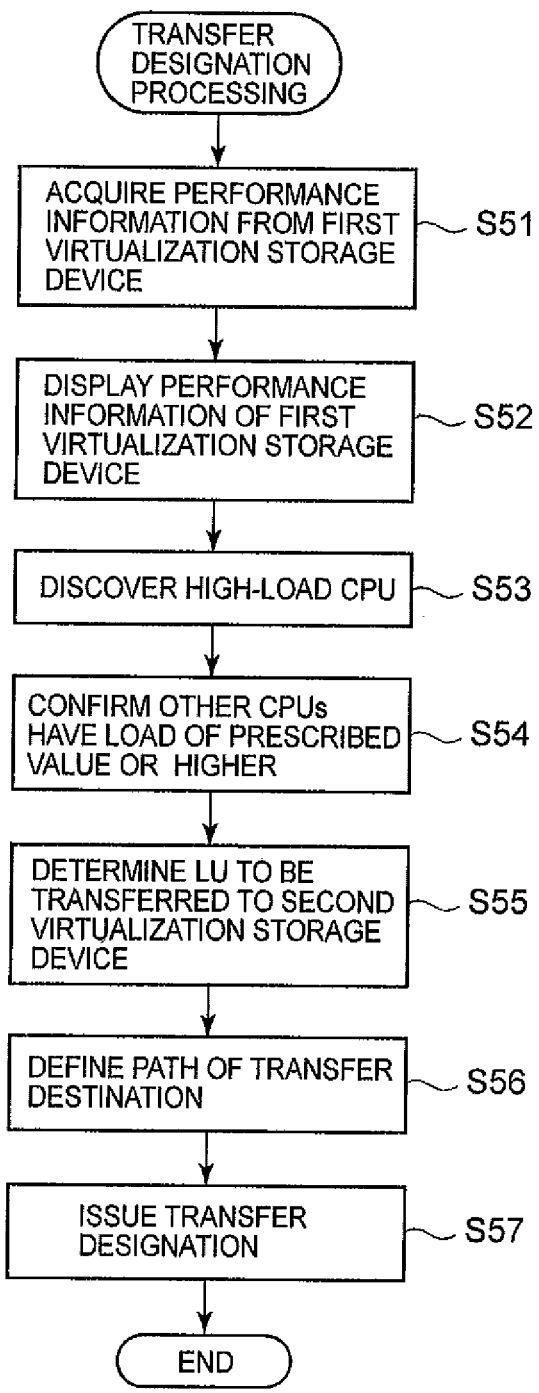
FIG. 11 is a flowchart showing the transfer designation processing to be performed using the management terminal.

FIG. 11 is a flowchart showing the processing for designating the transfer of the volume to the respective virtualization storage devices 100A, 100B.

For example, when the user provides a designation to the management terminal 20, the monitoring unit 21 acquires performance information from the first virtualization storage device 100A (S51). The monitoring unit 21 displays the acquired performance information on a terminal screen of the management terminal 20 (S52). This performance information corresponds to the information showing the "load status", and, for instance, includes the input/output per second (IOPS), CPU usage rate, cache memory usage rate and so on.

The user discovers whether there is a high-load CPU based on the performance information displayed on the screen of the management terminal 20 (S53). This CPU represents the CPU built in the CHA 110. Next, the user confirms that every CPU of other CHAs 110 is of a load that is greater than a prescribed value (S54).

And, in order to alleviate the load of the high-load CHA 110, the user determines the transfer of the external volume 240 under the control of such CHA 110 (S55). Subsequently, the user sets a path of the transfer destination (S56). In other words, the user defines the path information regarding which port the host 10 will use for the access in the second virtualization storage device 100B, which is the transfer destination (S56). The defined path information is added to the host 10. Finally, the user designates the transfer of such external volume 240 to the respective virtualization storage devices 100A, 100B (S57).

In other words, the user specifies the external volume that is being the bottleneck in the first virtualization storage device 100A, which is the transfer source (switching source) (S53 to S55) based on the monitoring result of the monitoring unit 21 (S51, S52), and designates the start of transfer by defining the path of the transfer destination (S56, S57). Each of the foregoing processing steps may also be conducted automatically.

Figure 12:
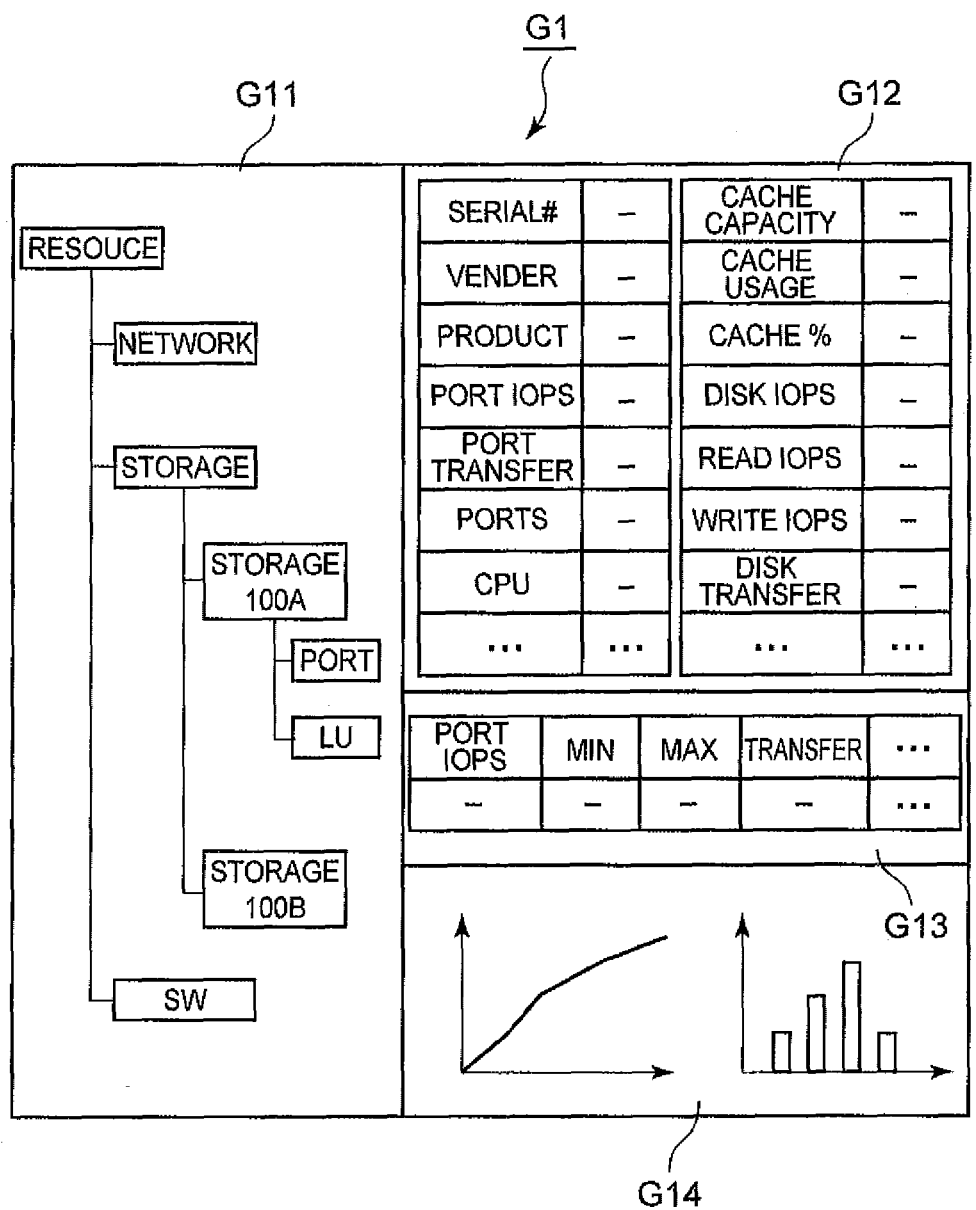
FIG. 12 is an explanatory diagram showing a screen display example of the load status being monitored with the management terminal.

FIG. 12 is an explanatory diagram showing an example of a screen showing the monitoring result of the monitoring unit 21. The monitoring unit 21 is able to respectively acquire performance information from the respective virtualization storage devices 100A, 100B, and display such performance information upon performing statistical processing or creating a graphical chart thereof.

In the selection unit G11, it is possible to select which load status regarding which resource among the various resources in the storage system is to be displayed. Here, as the resource, for instance, "network", "storage", "switch" and so on may be considered.

When the user selects "storage", the user may further select one of the virtualization storage devices 100A, 100B. Further, when the user selects one of the virtualization storage devices 100A, 100B, the user may make a more detailed selection. As such detailed selection, "port" and "LU" may be considered. As described above, the user is able to select in detail the desired target for confirming the load status.

For example, in the first display unit G12, the overall status of the selected virtualization storage device can be displayed as a list among the virtualization storage devices 100A, 100B. With the second display unit G13, for example, a more detailed monitoring target status, such as the "port" and "LU", can be displayed. Further, with the third display unit G13, the load status can be displayed as a graph.

The user is able to relatively easily determine which part of which virtualization storage device is a bottleneck based on the performance monitoring screen as shown in FIG. 12. Thus, the user is able to determine the volume to be transferred based on such determination.

Figure 13:
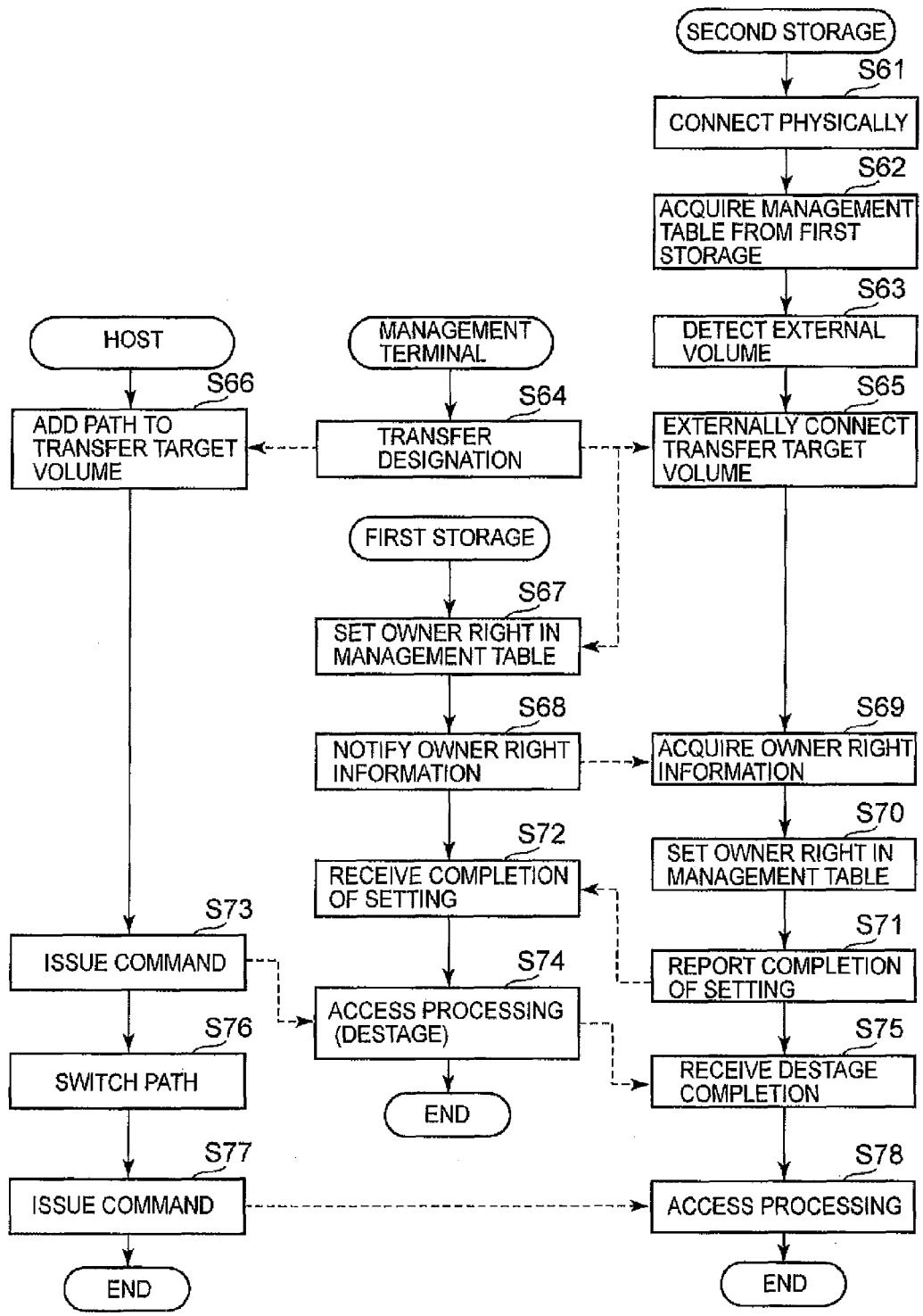
FIG. 13 is a flowchart showing the outline of the processing for newly adding the second virtualization storage device to the storage system and transferring the volume from the first virtualization storage device.

FIG. 13 is a flowchart showing the situation of newly adding a second virtualization storage device 100B to the storage system in a state where the first virtualization storage device 100A is in operation, and transferring one or a plurality of volumes from the first virtualization storage device 100A to the second virtualization storage device 100B. Incidentally, in FIG. 13 and so on, the first virtualization storage device 100A is abbreviated as the "first storage" and the second virtualization storage device 100B is abbreviated as the "second storage", respectively.

The user will be able to comprehend the load status of the first virtualization storage device 100A with the methods described with reference to FIG. 11 and FIG. 12. As a result, the user will be able to determine the additional injection of the second virtualization storage device 100B.

Foremost, the user or engineer of the vendor performs physical connection procedures of the newly introduced second virtualization storage device 100B (S61). Specifically, the host connection interface 111T of the second virtualization storage device 100B is connected to the upper level network CN1, the external storage connection interface 111E of the second virtualization storage device 100B is connected to the lower level network CN2, and the SVP 170 of the second virtualization storage device 100B is connected to the network CN3.

Next, the second virtualization storage device 100B acquires the memory contents of the management table T1A from the first virtualization storage device 100A (S62). Based on such acquired contents, the second virtualization storage device 100B creates a management table T1B. The second virtualization storage device 100B respectively detects the external volumes 240 in the storage system based on the management table T1B (S63).

When the user designates the transfer of the volume from the management terminal 20 (S64), the second virtualization storage device 100B connects the designated external volume 240 to the V-VOL 163 via the interface 111E (S65).

Figure 17:
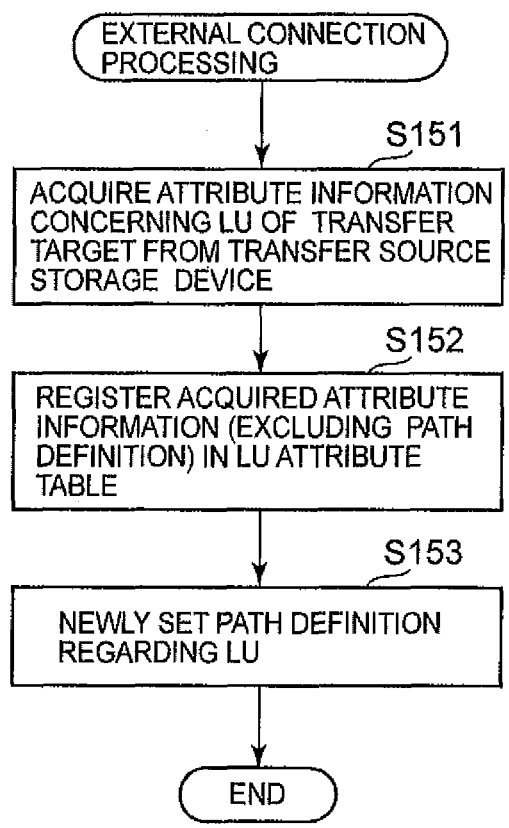
FIG. 17 is a flowchart showing the processing for the second virtualization storage device, which is the transfer destination, to connect with the external volume, which is the transfer target.

Details of external connection are shown in FIG. 17. Thus, explanation will foremost be made with reference to FIG. 17. The second virtualization storage device 100B acquires attribute information relating to the transfer target volume from the storage device of the transfer source; that is, the first virtualization storage device 100A (S151). The second virtualization storage device 100B registers the attribute information other than the path information among the acquired attribute information in the attribute table T2B (S152). The second virtualization storage device 100B newly sets path definition information regarding the transfer target volume (S153).

Here, the user selects the logical volume 164 to be accessed from the host 10 as the transfer target. When the selected logical volume 164 is connected to the external volume 240, in hindsight, the external volume 240 connected to such logical volume 164 will be reconnected to a separate logical volume 164 of the transfer destination storage device (100B).

As described above, the virtualization storage devices 100A, 100B connect the external volume 240 to the logical volume 164 via the V-VOL 163, and are able to use this as though it is one's own internal memory apparatus.

Returning to FIG. 13, the volume management unit 12 of the host 10 adds the path information for accessing the transferred volume to the path setting information T3 (S66). In other words, path information for accessing the logical volume 164 connected to the external volume 240 via a prescribed port of the second virtualization storage device 100B is set.

The first virtualization storage device 100A sets an owner right regarding the external volume 240 designated as the transfer target (S67). In other words, "−1" is set in the owner right information regarding the transfer target volume. The first virtualization storage device 100A notifies the set owner right information to the second virtualization storage device 100B (S68).

When the second virtualization storage device 100B acquires the owner right information from the first virtualization storage device 100A (S69), it registers the acquired owner right information in the management table T1B (S70). Here, the owner right information is registered in the management table T1B upon the value thereof being changed to "1". This is because the usage authorization of the transfer target volume has been transferred to the second virtualization storage device 100B. The second virtualization storage device 100B reports the completion of registration of the owner right information to the first virtualization storage device 100A (S71). The first virtualization storage device 100A receives the setting completion report of the owner right information from the second virtualization storage device 100B (S72).

When the access request relating to the transfer target volume is issued by the host 10 (S73), the first virtualization storage device 100A starts the destage processing without processing the access request (S74). Access processing in the transfer source before the completion of transfer will be described later with reference to FIG. 14. The second virtualization storage device 100B receives a notice indicating the completion of destage processing from the first virtualization storage device 100A (S75).

Meanwhile, when the command processing issued to the first virtualization storage device 100A is rejected, the host 10 refers to the path setting information T3, switches to a different path (S76), and reissues the command (S77). Here, for the sake of convenience of explanation, the switch shall be from the primary path passing through the first virtualization storage device 100A to the second alternate path passing through the second virtualization storage device 100B.

When the second virtualization storage device 100B receives a command from the host 10, it performs access processing (S78). If at the point in time of receiving the command the destage processing of the transfer target volume is complete, normal access processing will be performed. If the destage processing is not complete, however, different access processing will be performed. Access processing in the transfer destination before the completion of the transfer will be described later with reference to FIG. 15. Incidentally, the flow shown in FIG. 13 is merely an example, and, in reality, there are cases where the order of steps will be different.

Figure 14:
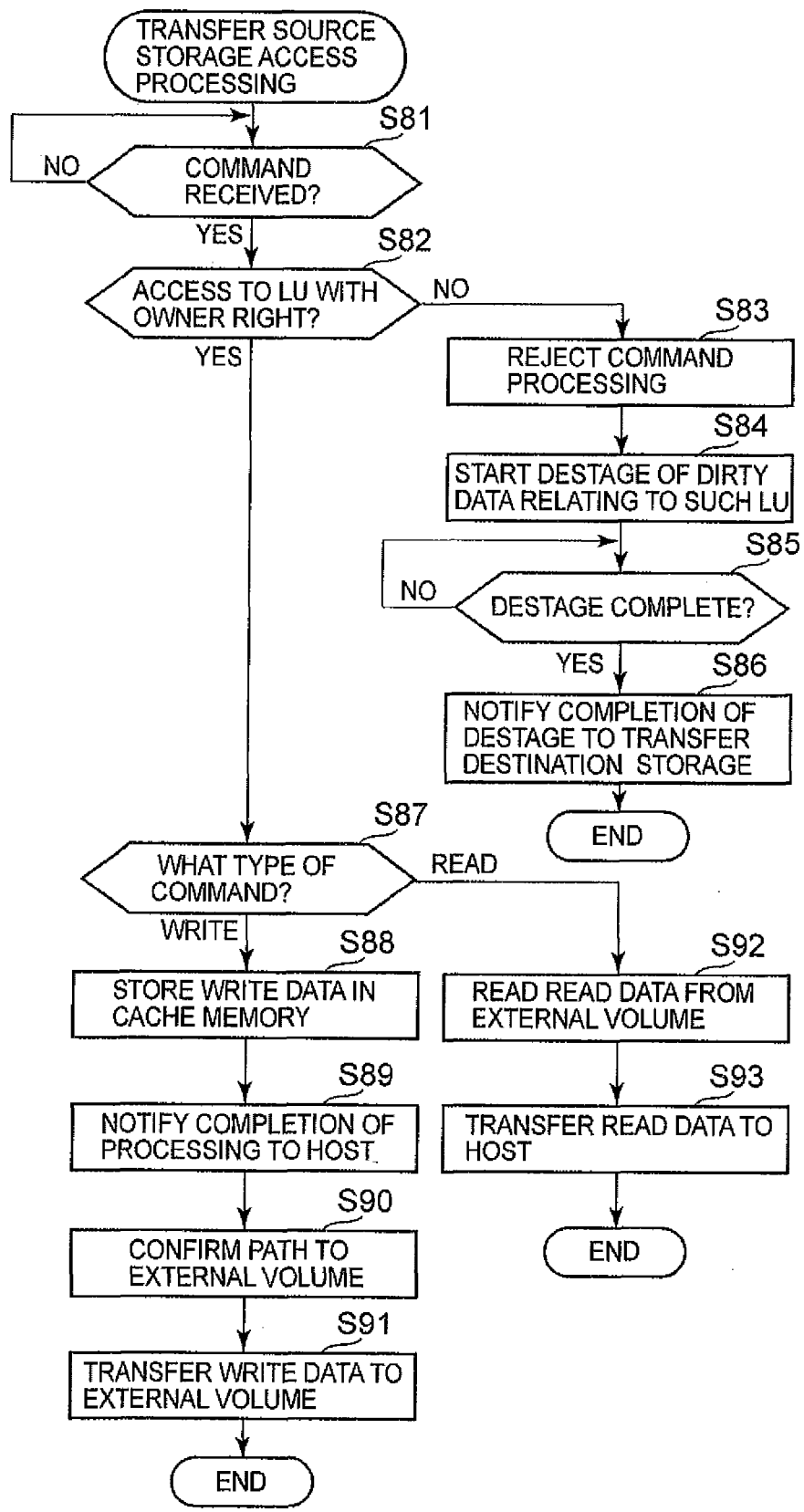
FIG. 14 is a flowchart showing the access processing to be executed with the first virtualization storage device, which is the transfer source.

FIG. 14 is a flowchart showing the details of S74 in FIG. 13. When the first virtualization storage device 100A, which is the transfer source storage device, receives a command from the host 10 (S81: YES), it analyzes the access target of such command. The first virtualization storage device 100A determines whether the command in which the logical volume 164 connected to the external volume 240 of its own usage authorization is the access target (S82). In other words, the first virtualization storage device 100A determines whether the command is an access request relating to the external volume 240 in which it has the owner right.

When the first virtualization storage device 100A determines that it is an access to the logical volume 164 connected to the external volume 240 in which it does not have the usage authorization; that is, the external volume 240 in which "−1" is set in the owner right information (S82: NO), the command processing from the host 10 is rejected (S83). Refection of the command processing, for instance, may be made by not replying for a prescribed period of time (negative rejection), or by notifying the host 10 that processing is impossible (positive rejection).

The first virtualization storage device 100A starts the destage processing of dirty data regarding the external volume 240 in which the access was requested from the host 10 (S84). And, when the destage processing is complete (S85: YES), the first virtualization storage device 100A notifies the second virtualization storage device 100B to such effect (S86).

A more detailed explanation is now provided. The access target of the host 10 is the logical volume 164 of the first virtualization storage device 100A. The logical volume 164 is selected as the transfer target. and, this logical volume 164 is connected to the logical volume 240 of the external storage device 200.

Here, the first virtualization storage device 100A is processing the write command in the asynchronous transfer mode. Accordingly, the first virtualization storage device 100A reports the completion of writing to the host 10 at the time the write data received from the host 10 is stored in the cache memory 130. The write data stored in the cache memory 130 is transferred to the external storage device 200 in a prescribed timing, and reflected in the external volume 240.

At the stage before the write data is written in the external volume 240, the data stored in the cache memory 130 of the first virtualization storage device 100A and the data stored in the external volume 240 are different. Updated data regarding a certain segment or a segment group is stored in the cache memory 130, and old data before the update is regarding the same segment or segment group is stored in the external volume 240. As described above, data that is not reflected in the external volume 240 and which does not coincide with the memory contents of the cache memory 130 and the memory contents of the external volume 240 is referred to as dirty data. Incidentally, data in which write data is written in the external volume 240 and which coincides with the memory contents of the cache memory 130 and the memory contents of the external volume 240 is referred to as clean data. The processing of writing and reflecting the dirty data stored in the cache memory 130 of the first virtualization storage device 100A into the external volume 240 is referred to as destage processing.

In the present embodiment, in order to maintain the consistency of data before and after the transfer of volume, when the owner right is changed, the first virtualization storage device 100A, which is the transfer source, with perform destage processing without processing the access request from the host 10.

Meanwhile, when the access target from the host 10 is a logical volume 164 other than the transfer target (S82: YES), the first virtualization storage device 100A identifies the type of command (S87), and performs normal access processing.

When it is a write command, the first virtualization storage device 100A stores the write data received from the host 10 in the cache memory 130 (S88), and notifies the host 10 of the completion of writing (S89). Next, while looking out for a prescribed timing, the first virtualization storage device 100A refers to the management table T1A, confirms the path to the external volume 240 (S90), and transfers the write data to the external volume 240 (S91).

When it is a read command, the first virtualization storage device 100A reads the data requested from the host 10 from the external volume 240 (S92), and transfers this data to the host 10 (S93). Incidentally, when reading data from the external volume 240, the management table T1A is referred to. Further, when the data requested from the host 10 already exists on the cache memory 130 (when the data has been sliced), the first virtualization storage device 100A transfers the data stored in the cache memory 130 to the host 10 without accessing the external volume 240.

Figure 15:
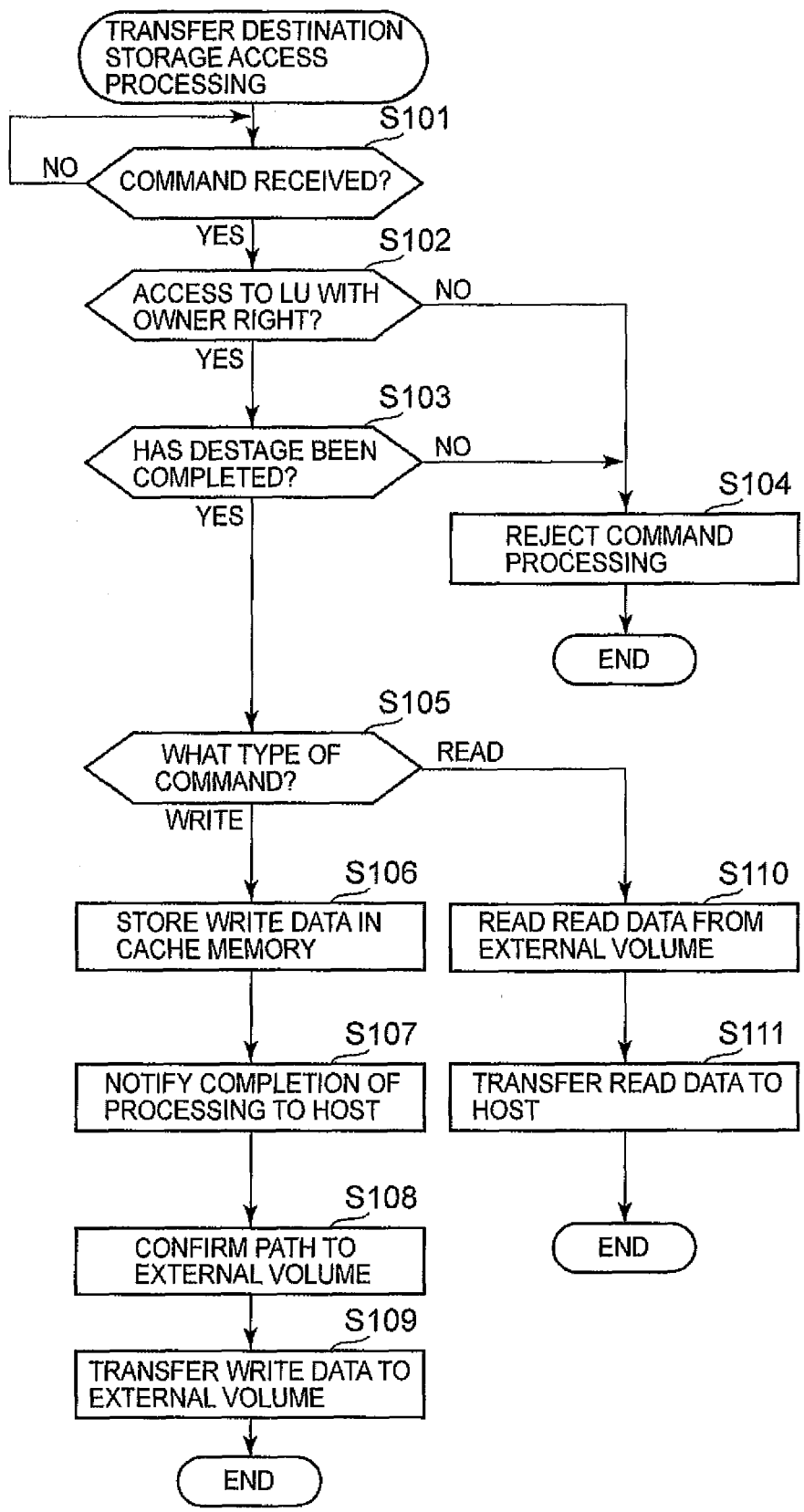
FIG. 15 is a flowchart showing the access processing to be executed with the second virtualization storage device, which is the transfer destination.

FIG. 15 is a flowchart showing the details of S78 in FIG. 13. When the second virtualization storage device 100B, which is the transfer destination, receives a command from the host 10 (S101: YES), it analyzes the access target of such command. The second virtualization storage device 100B determines whether the access target of the host 10 is a logical volume 164 connected to the external volume 240 under the control of the second virtualization storage device 100B (S102). In other words, the second virtualization storage device 100B determines whether the command is an access request relating to the external volume 240 in which it has the owner right thereof.

When the second virtualization storage device 100B determines that this is an access request relating to the volume in which it has the owner right thereof (S102: YES), it determines whether the destage processing performed by the first virtualization storage device 100A regarding the external volume 240 connected to the logical volume 164 thereof is complete (S103). In other words, the second virtualization storage device 100B determines whether a destage completion notification has been acquired from the first virtualization storage device 100A regarding such volume.

When the second virtualization storage device 100B does not have an owner right with respect to the access target of the host 10 (S102: NO), or when the second virtualization storage device 100B has the owner right but the destage processing at the transfer source is not complete (S103: NO), the second virtualization storage device 100B rejects the command processing (S104). This is in order to maintain the consistency of data regarding the transfer target volume.

Contrarily, when the second virtualization storage device 100B has the owner right regarding the access target volume from the host 10 (S102: YES), and the destage processing at the transfer destination regarding the volume is complete (S103: YES), the second virtualization storage device 100B is able to perform the normal access processing. The normal access processing performed by the second virtualization storage device 100B is the same as the normal access processing performed by the first virtualization storage device 100A.

In other words, the second virtualization storage device 100B distinguishes the type of command received from the host 10 (S105). When it is a write command, the second virtualization storage device 100B stores the write data received from the host 10 in the cache memory 130 (S106), and thereafter notifies the completion of writing to the host 10 (S107). And, the second virtualization storage device 100B refers to the management table T1B, confirms the path to the external volume 240 (S108), and transfers the write data stored in the cache memory 130 to the external volume and writes it therein (S109).

When it is a read command, the second virtualization storage device 100B reads the data requested from the host 10 from the external volume 240 (or cache memory 130) (S110), and transfers this data to the host 10 (S111).

The foregoing explanation is an example of newly introducing the second virtualization storage device 100B to the storage system. Next, a case of introducing the second virtualization storage device 100B and thereafter dispersing the load is explained.

Figure 16:
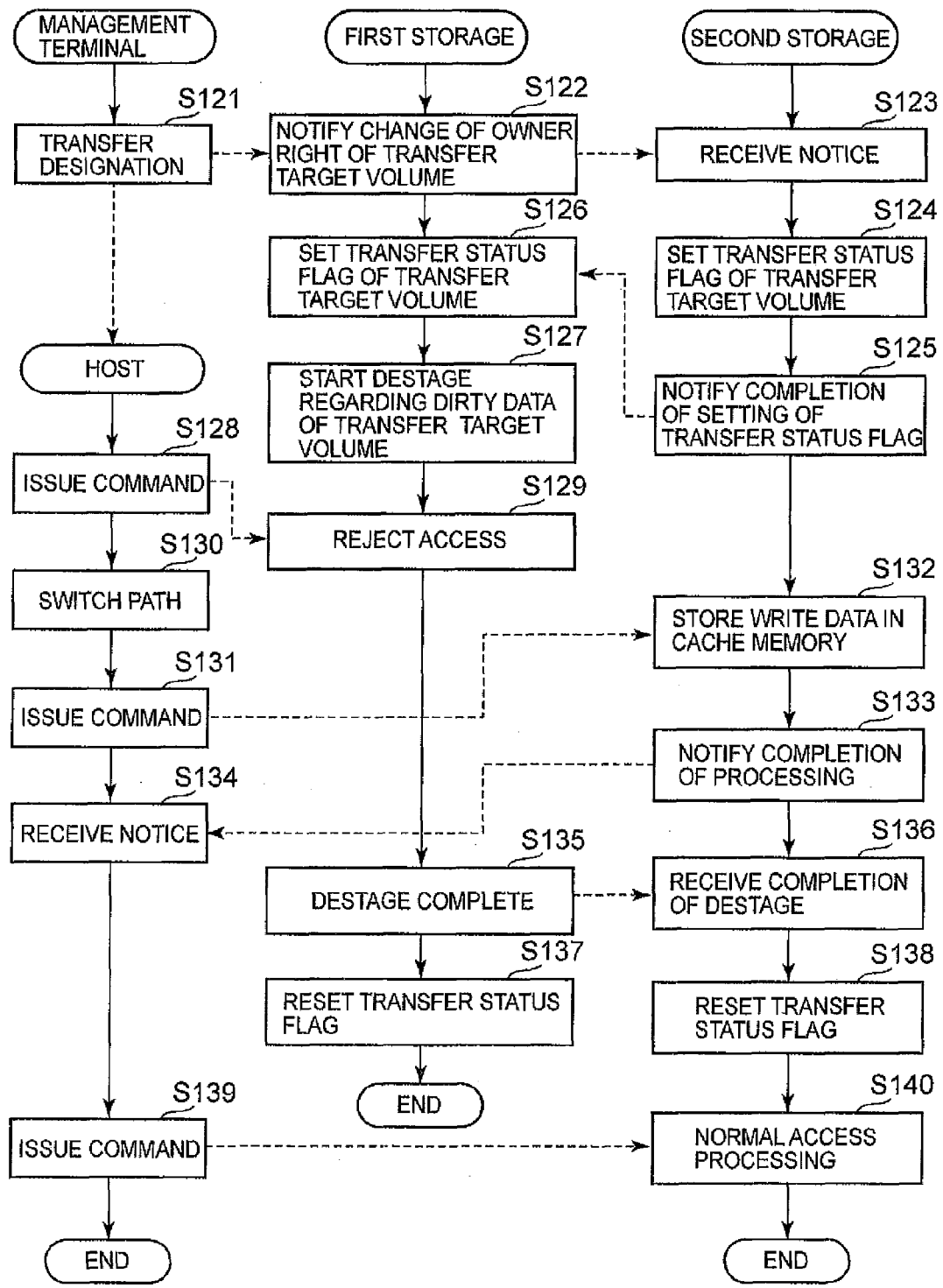
FIG. 16 is a flowchart showing the outline of the processing for transferring the volume between a plurality of virtualization storage devices.

FIG. 16 is a flowchart showing a different example of transferring a volume between the respective virtualization storage devices 100A, 100B.

The user is able to comprehend the operational status of the storage system based on the monitoring result of the monitoring unit 21. For example, when the user judges that the load of the first virtualization storage device 100A is heavy, the user may issue a designation so as to transfer the external volume 240 under the control of the first virtualization storage device 100A to the second virtualization storage device 100B via the management terminal 20 (S121). Further, a path for accessing via the second virtualization storage device 100B is added to the path setting information T3 of the host 10 based on the transfer designation from the management terminal 20.

When the first virtualization storage device 100A receives a transfer designation from the management terminal 20, it changes the owner right of the external volume designated as the transfer target from "1" to "−1", and notifies this change to the second virtualization storage device 100B (S122).

When the second virtualization storage device 100B receives a notice from the first virtualization storage device 100A (S123), it sets "1" in the transfer status flag relating to the transfer target volume and updates the management table T1B (S124), and notifies the completion of setting of the transfer status flag to the first virtualization storage device 100A (S125).

When the first virtualization storage device 100A receives a notice from the second virtualization storage device 100B, similarly, it sets "1" in the transfer status flag relating to the transfer target volume and updates the management table T1A (S126). And, the first virtualization storage device 100A starts the destage processing of dirty data relating to the transfer target volume (S127).

Before the completion of the destage processing, if a command requesting access to the transfer target logical volume 164 is issued from the host 10 (S128), the first virtualization storage device 100A will reject such processing (S129).

When the access processing is rejected by the first virtualization storage device 100A, the host 10 refers to the path setting information T3 and switches the path (S130). Here, the explanation is regarding a case of switching from the primary path passing through the first virtualization storage device 100A to the alternate path passing through the second virtualization storage device 100B. After switching the path, the host 10 reissues the command (S131). This command may be a write command or a read command, and let it be assumed that a write command has been issued for the sake of convenience of explanation.

When the second virtualization storage device 100B receives a write command from the host 10 (S132), it receives write data transmitted from the host 10 after the write command, and stores this in the cache memory 130 (S132). After storing the write data in the cache memory 130, the second virtualization storage device 100B reports the completion of writing to the host 10 (S133). The host 10 receives a processing completion notice from the second virtualization storage device 100B (S134).

Meanwhile, when the destage processing performed by the first virtualization storage device 100A is complete (S135), the first virtualization storage device 100A notifies the completion of the destage processing to the second virtualization storage device 100B (S136). When the second virtualization storage device 100B receives this destage completion notice (S137), it resets the transfer status flag relating to the transfer target volume (S138). Thereby, the transfer of the volume is completed while maintaining the consistency of the volume. After the transfer of the volume is complete, if the host 10 issues a different command (S139), the second virtualization storage device 100B performs the normal access processing (S140).

Incidentally, if the command issued at S131 is a read command, the second virtualization storage device 100B may reject the processing of the read command until the destage processing by the first virtualization storage device 100A is complete.

Figure 18:
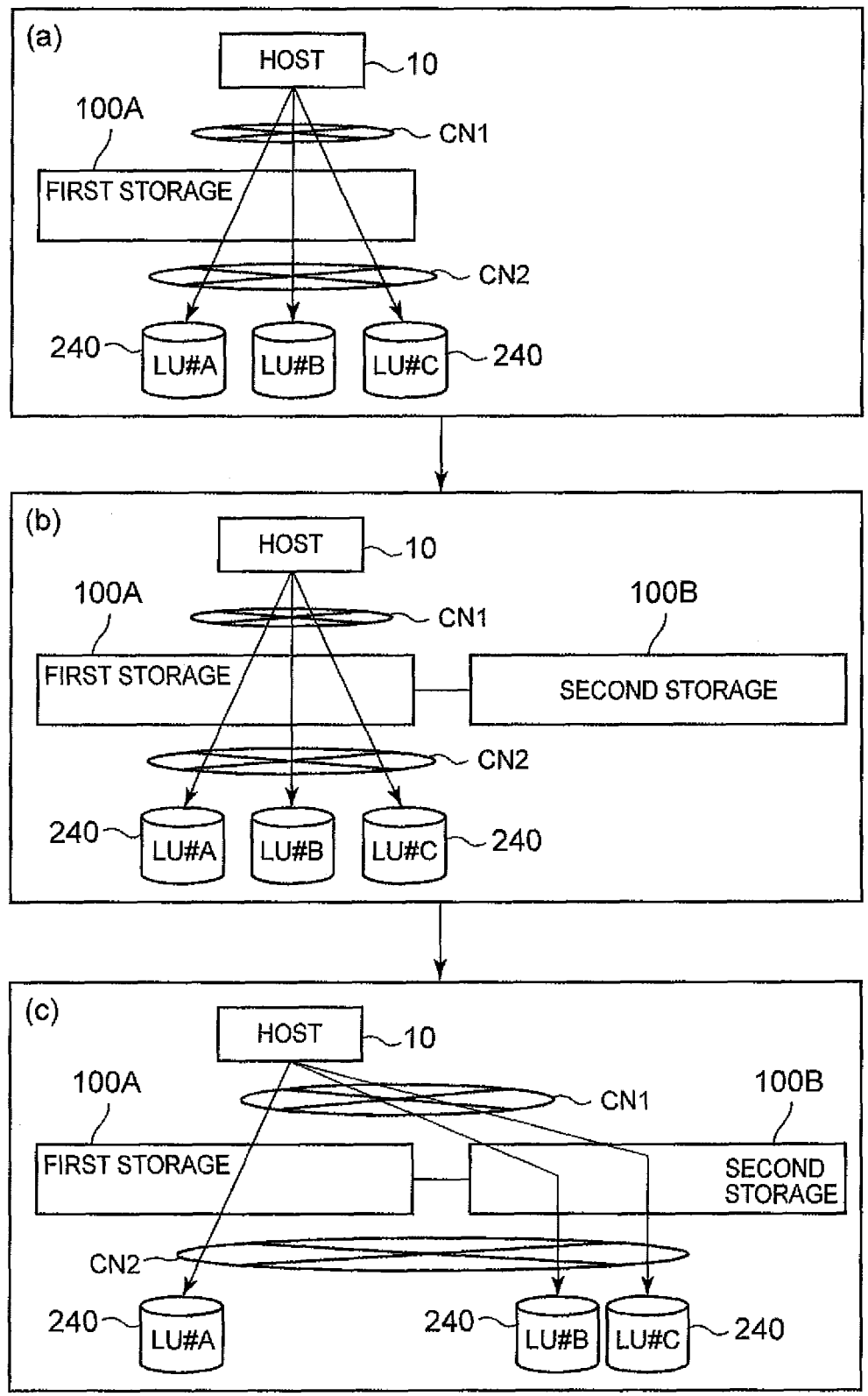
FIG. 18 is an explanatory diagram showing the frame format of the situation of operating the storage system with a plurality of virtualization storage devices.

FIG. 18 is an explanatory diagram showing a frame format of the situation of transferring the volume according to the present embodiment. Foremost, as shown in FIG. 18(a), let it be assumed that only the first virtualization storage device 100A is initially operating in the storage system. Under these circumstances, the first virtualization storage device 100A is using all external volumes 240.

As shown in FIG. 18(b), the user determines the introduction of the second virtualization storage device 100B based on the load status of the first virtualization storage device 100A, and adds the second virtualization storage device 100B to the storage system.

As shown in FIG. 18(c) when the user designates the transfer of the volume 240 of "#B" and "#C" via the management terminal 20, these volumes 240 are connected to the logical volume 164 of the second virtualization storage device 100B. More precisely, when the user designates the transfer of a volume regarding the logical volume 164 of the first virtualization storage device 100A, the external volumes 240 (#B, #C) connected to the transfer target logical volume 164 are re-connected to the logical volume 164 of the second virtualization storage device 100B. Thereby, at least a part of the load of the first virtualization storage device 100A will be transferred to the second virtualization storage device 100B, and the bottleneck in the first virtualization storage device 100A can be resolved. As a result, the response performance and efficiency of the overall storage system can be improved.

As described above, according to the present embodiment, a plurality of virtualization storage devices 100A, 100B may be used to manage each of the external volumes 240. Accordingly, the load in the storage system can be dispersed and the processing performance of the overall storage system can be improved.

In the present embodiment, the external volume 240 can be transferred between the respective virtualization storage devices 100A, 100B without stopping the access from the host 10. Therefore, the volume can be transferred via online without having to shut down the host 10, and the usability will improve.

In the present embodiment, the user merely needs to make a designation via the management terminal 20 to transfer the external volume 240 between the respective virtualization storage devices 100A, 100B. Accordingly, in a storage system having a plurality of virtualization storage devices 100A, 100B capable of virtualizing and using the external volume 240, the performance of the storage system can be improved with a relatively simple operation.

In the present embodiment, the virtualization storage device 100A, which is the transfer source, is configured such that it can reject the access request from the host 10 until the destage processing relating to the transfer target external volume 240 is complete. Therefore, the volume can be transferred while maintaining the consistency of data.

2. Second Embodiment

The second embodiment of the present invention is now explained with reference to FIG. 19. The present embodiment corresponds to a modified example of the foregoing first embodiment. In the present embodiment, the storage system autonomously disperses the load between the respective virtualization storage devices 100A, 100B.

Figure 19:
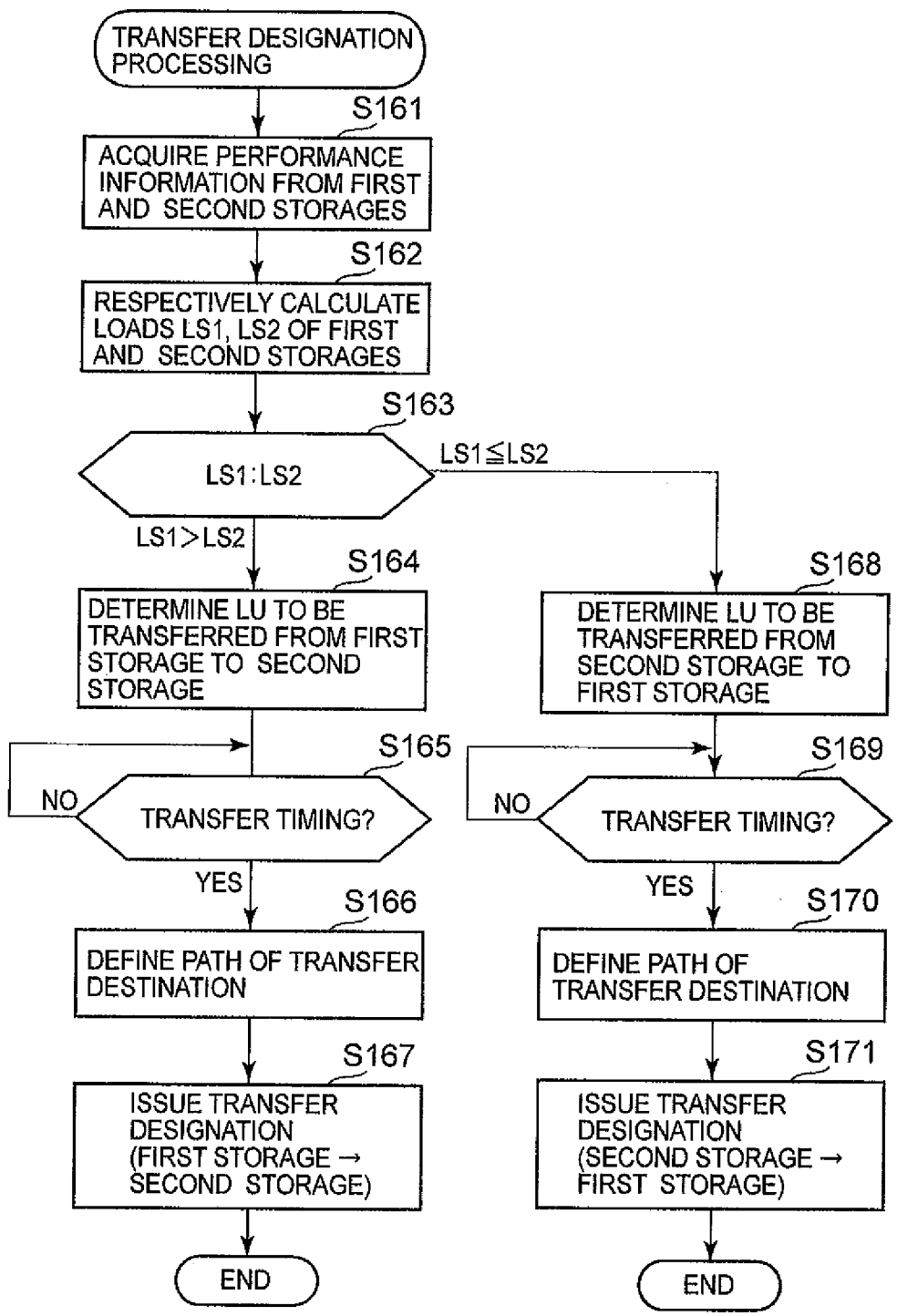
FIG. 19 is a flowchart showing the transfer designation processing to be executed with the storage system according to the second embodiment.

FIG. 19 is a flowchart of the transfer designation processing according to the present embodiment. This transfer designation processing, for example, can be executed with the management terminal 20. The management terminal 20 acquires the performance information from the respective virtualization storage devices 100A, 100B (S161). The management terminal 20, based on each type of performance information, respectively calculates the loads LS1, LS2 of the respective virtualization storage devices 100A, 100B (S162). These loads, for example, may be calculated based on the input/output per second, CPU usage rate, cache memory usage rate and the like.

The management terminal 20 compares the load LS1 of the first virtualization storage device 100A and the load LS2 of the second virtualization storage device 100B (S163). When the first load LS1 is greater than the second load LS2 (LS1>LS2), the management terminal 20 determines the logical volume (external volume) to the transferred from the first virtualization storage device 100A to the second virtualization storage device 100B (S164). The management terminal 20, for instance, may select the volume of the highest load in the device.

The management terminal 20 judges whether the transfer timing has arrived (S165), and, when the transfer timing has arrived (S165: YES), it defines the path information of the transfer destination (S166), and respectively issues a transfer designation to the respective virtualization storage devices 100A, 100B (S166). For example, a time frame with low access frequency from the host 10 may be pre-selected as the transfer timing.

Meanwhile, when the second load LS2 is equal to or greater than the first load LS1 (LS1≦LS2), the management terminal 20 determines the volume to be transferred from the second virtualization storage device 100B to the first virtualization storage device 100A (S168).

The management terminal 20, as described above, looks out for a prescribed transfer timing (S169: YES), defines the path of the transfer destination (S170), and respectively issues a transfer designation to the respective virtualization storage devices 100A, 100B (S171).

The present embodiment configured as described above also yields the same effects as the foregoing embodiments. In addition, with the present embodiment, the load dispersion between the plurality of virtualization storage devices 100A, 100B capable of respectively virtualizing the external volume 240 can be performed autonomously.

Incidentally, the present invention is not limited to the embodiments described above. Those skilled in the art may make various additions and modifications within the scope of the present invention.

For example, in each of the foregoing embodiments, although a case was mainly explained where a plurality of virtualization storage devices coexists, the present invention is not limited thereto, the configuration may also be such that all external volumes are transferred to the second virtualization storage device, and the first virtualization storage device may be entirely replaced with the second virtualization storage device.

Further, in each of the foregoing embodiments, although a case was mainly explained where the management terminal is configured from a separate computer, the present invention is not limited thereto, and the configuration may be such that the function of the management terminal is built in one of the virtualization storage devices.

Moreover, in each of the foregoing embodiments, although a case was mainly explained where two virtualization storage devices are used, the present invention is not limited thereto, and the present invention may also be applied to cases of using three or more virtualization storage devices.

Further, in each of the foregoing embodiments, although a case was mainly explained where the virtualization storage devices are operated in an asynchronous transfer mode, these may also be operated in a synchronous transfer mode. When operating the virtualization storage devices in a synchronous transfer mode, generally speaking, since the memory contents of the external volume will always be updated to be the latest contents, such memory contents may be transferred between the respective virtualization storage devices quickly without having to wait for the completion of the destage processing at the transfer source.

Incidentally, when transferring a volume, the logical volume 164 of the transfer source and the logical volume 164 of the transfer destination will be set to be of the same size.

What is claimed is:

1. A storage system comprising;
an external storage device including a plurality of external physical storage devices and an external storage controller being configured to manage an external logical volume on the external physical storage devices;
a first virtualization device coupled to a computer and the external storage device, and being configured to provide a first logical volume, which includes a first virtual storage area mapped to all or a part of a storage area of the external logical volume provided by the external storage device, to the computer through a first port and a second port; and
a second virtualization device coupled to the computer and the external storage device, and begin configured to provide a second logical volume to the computer through a third port, wherein the second logical volume includes a second virtual storage area mapped to the all or the part of the storage area, which is also mapped to the first virtual storage area in the first logical volume, of the external logical volume,
wherein a first path is defined between the first logical volume and the computer through the first port, a second path is defined between the first logical volume and the computer through the second port, and a third path is defined between the second logical volume and the computer through the third port,
wherein at a point in time during which the first virtualization device provides the first logical volume by a first identification number of the first logical volume and a first port number of the first port to the computer by the first path, the first virtualization device also provides the first logical volume by the first identification number of the first logical volume and a second port number of the second port to the computer by the second path, and the second virtualization device also provides the second logical volume by a second identification number of the second logical volume and a third port number of the third port to the computer by the third path, and wherein first identification number is the same as the second identification number and the first, second and third port numbers are different from each other.

2. A storage system according to claim 1, wherein the first logical volume and the second logical volume are volumes of access targets by the computer.

3. A storage system according to claim 1, wherein each of the first and second identification numbers is a logical unit number for identifying volumes of access targets by the computer.

4. A storage system according to claim 1, wherein the computer includes a plurality of host bus adapters, wherein the first virtualization device includes the first port and the second port, wherein the second virtualization device includes the third port, wherein the first path is identified by the combination of a first host bus adapter number for identifying at least one of the host bus adapters, the first port number, and the first identification number for identifying the first logical volume, wherein the second path is identified by the combination of a second host bus adapter number for identifying at least one of the host bus adapters, the second port number, and the first identification number for identifying the first logical volume, and wherein the third path is identified by the combination of the second host bus adapter number for identifying at least one of the host bus adapters, the third port number, and the second identification number for identifying the second logical volume.

5. A storage system according to claim 1, wherein the computer is configured to switch the first path to the second path or the third path in case that a request to the first logical volume through the first path is not processed by the first virtualization device.

6. A storage system according to claim 1, wherein information regarding an owner right, which indicates authority to use the external logical volume, can be transferred by the first virtualization device to the second virtualization device, while both the first path and the third path are defined.

7. A storage system according to claim 6, wherein if the first virtualization device has said owner right and receives a first write command to the first logical volume through the first path, the first virtualization device transfers a third write command corresponding to the first write command to the external logical volume, and wherein if the first virtualization device does not have the owner right and receives the first write command through the first path, the first virtualization device rejects processing the first write command to switch the first path to the third path.

8. A storage system according to claim 1, wherein the first virtualization device is coupled to the external storage device through a storage area network, and wherein the second virtualization device is coupled to the external storage device through the storage area network.

9. A storage system according to claim 1, wherein the first virtualization device holds first mapping information indicating mapping between the first logical volume and the all or the part of the storage area in the external logical volume, and wherein the second virtualization device holds second mapping information indicating mapping between the second logical volume and the all or the part of the storage area in the external logical volume.

10. A storage system comprising;

an external storage device including a plurality of external physical storage devices and a controller begin configured to manage an external logical volume on the external physical storage devices;

a first virtualization device coupled to the external storage device through a storage area network, and being configured to provide a first virtual volume, which includes a first virtual storage area corresponding to all or a part of a storage area in the external logical volume provided by the external storage device, to a computer through a first port, and a second port; and a second virtualization device coupled to the external storage device through the storage area network, and being configured to provide a second virtual volume to the computer through a third port, wherein the second virtual volume includes a second virtual storage area corresponding to the all or the part of the storage area, which corresponds to the first virtual storage area in the first virtual volume, in the external logical volume, wherein at a point in time during which the first virtualization device provides the first virtual volume by a first identification number of the first virtual volume and a first port number of the first port to the computer, the first virtualization device also provides the first logical volume by the first identification number of the first logical volume and a second port number of the second port to the computer, and the second virtualization device also provides the second virtual volume by a second identification number of the second virtual volume and a third port number of the third port to the computer, and wherein the first identification number is the same as the second identification number and the first, second and third port numbers are different from each other.

11. A storage system according to claim 10, wherein each of the first and second identification numbers is a logical unit number used for identifying an access target volume by the computer.

12. A storage system according to claim 10, wherein first and second paths are defined between the first virtual volume and the computer and a third path is defined between the second virtual volume and the computer, and wherein the computer is configured to switch the first path to the second path or the third path in case that a request to the first virtual volume through the first path is not processed by the first virtualization device.

13. A storage system according to claim 1, wherein the first virtualization device holds first information indicating correspondence between the first logical volume and the all or the part of the storage area in the external logical volume, and wherein the second virtualization device holds second information indicating correspondence between the second logical volume and the all or the part of the storage area in the external logical volume.

14. A storage system according to claim 12,
wherein information regarding an owner right, which indicates authority to use the external logical volume, can be transferred from the first virtualization device to the second virtualization device, while both the first path and the third path are defined.

15. A storage system according to claim 14,
wherein if the first virtualization device has said owner right and receives a first write command to the first virtual volume through the first path, the first virtualization device transfers a third write command corresponding to the first write command to the external logical volume through the storage area network, and
wherein if the first virtualization device does not have the owner right and receives the first write command through the first path, the first virtualization device rejects processing the first write command to switch the first path to the third path.

16. A virtualization storage system comprising;
a first virtualization device coupled to an external storage device, which includes a plurality of external physical storage devices and a controller being configured to manage an external logical volume on the external physical storage devices, through a storage area network; and
a second virtualization device coupled to the external storage device through the storage area network,
wherein the first virtualization device is configured to provide a first virtual volume, which includes a first virtual storage area corresponding to all or a part of a storage area in the external logical volume provided by the external storage device, to a computer through a first port and a second port,
wherein the second virtualization device is configured to provide a second virtual volume to the computer through a third port, wherein the second virtual volume includes a second virtual storage area corresponding to the all or the part of the storage area, which corresponds to the first virtual storage area in the first virtual volume, in the external logical volume,
wherein at a point in time during which the first virtualization device provides the first virtual volume by a first identification number of the first virtual volume and a first port number of the first port to the computer, the first virtualization device also provides the first logical volume by the first identification number of the first logical volume and a second port number of the second port to the computer, and the second virtualization device also provides the second virtual volume by a second identification number of the second virtual volume and a third port number of the third port to the computer, and,
wherein the first identification number is the same as the second identification number and the first, second and third port numbers are different from each other.

17. A virtualization storage system according to claim 16, wherein each of the first and second identification numbers is a logical unit number used for identifying an access target volume by the computer.

18. A virtualization storage system according to claim 16,
wherein first and second paths are defined between the first virtual volume and the computer, and a third path is defined between the second virtual volume and the computer, and
wherein the computer is configured to switch the first path to the third path in case that a request to the first virtual volume through the first path is not processed by the first virtualization device.

19. A virtualization storage system according to claim 16,
wherein the first virtualization device holds first information indicating a correspondence between the first logical volume and the all or the part of the external logical volume, and
wherein the second virtualization device holds second information indicating a correspondence between the second logical volume and the all or the part of the external logical volume.

20. A storage system according to claim 19,
wherein information regarding an owner right, which indicates authority to use the external logical volume, can be transferred from the first virtualization device to the second virtualization device, while both the first path and the third path are defined.

21. A storage system according to claim 20,
wherein if the first virtualization device has said owner right and receives a first write command to the first virtual volume through the first path, the first virtualization device transfers a third write command corresponding to the first write command to the external logical volume through the storage area network, and
wherein if the first virtualization device does not have the owner right and receives the first write command through the first path, the first virtualization device rejects processing the first write command to switch the first path to the third path.

* * * * *

UNITED STATES PATENT AND TRADEMARK OFFICE
CERTIFICATE OF CORRECTION

PATENT NO.       : 8,484,425 B2  
APPLICATION NO.  : 13/222569  
DATED            : July 9, 2013  
INVENTOR(S)      : Innan et al.

Page 1 of 1

It is certified that error appears in the above-identified patent and that said Letters Patent is hereby corrected as shown below:

In the Claims

Column 30, line 46, delete "begin" and substitute --being--; and

Column 32, line 12, delete "begin" and substitute --being--.

Signed and Sealed this  
Twenty-ninth Day of October, 2013

Teresa Stanek Rea  
*Deputy Director of the United States Patent and Trademark Office*